United States Patent
Tanizawa

(10) Patent No.: US 8,121,008 B2
(45) Date of Patent: Feb. 21, 2012

(54) EVALUATION APPARATUS, EVALUATION METHOD, AND PROGRAM

(75) Inventor: Seiji Tanizawa, Kanagawa (JP)

(73) Assignee: Sony Disc & Digital Solutions Inc., Tokyo (JP)

( * ) Notice: Subject to any disclaimer, the term of this patent is extended or adjusted under 35 U.S.C. 154(b) by 606 days.

(21) Appl. No.: 12/264,384

(22) Filed: Nov. 4, 2008

(65) Prior Publication Data

US 2009/0122676 A1    May 14, 2009

(30) Foreign Application Priority Data

Nov. 13, 2007   (JP) ................................. 2007-294595

(51) Int. Cl.
*G11B 7/00*   (2006.01)
(52) U.S. Cl. .................................. 369/53.35; 369/53.22
(58) Field of Classification Search .............. 369/53.11, 369/53.16, 53.2, 53.22, 53.35, 59.11, 59.21, 369/59.22, 59.16
See application file for complete search history.

(56) References Cited

U.S. PATENT DOCUMENTS

| | | | |
|---|---|---|---|
| 2004/0160874 A1* | 8/2004 | Hwang et al. | 369/47.53 |
| 2005/0207306 A1* | 9/2005 | Umeda et al. | 369/59.11 |
| 2006/0083135 A1* | 4/2006 | Minemura | 369/47.51 |
| 2006/0285461 A1* | 12/2006 | Ashizaki et al. | 369/53.16 |
| 2007/0097822 A1* | 5/2007 | Iwanaga | 369/53.2 |
| 2007/0121461 A1* | 5/2007 | Kobayashi et al. | 369/59.11 |

FOREIGN PATENT DOCUMENTS

| | | |
|---|---|---|
| JP | 2001-117626 | 4/2001 |
| JP | 2002-74669 | 3/2002 |
| JP | 2005-149580 | 6/2005 |
| JP | 2006-344338 | 12/2006 |
| JP | 2007-514488 | 6/2007 |
| JP | 2007-213731 | 8/2007 |
| WO | WO 2005/101313 A1 | 10/2005 |

OTHER PUBLICATIONS

Office Action issued Jun. 28, 2011 in Japan Application No. 2007-294595.

* cited by examiner

*Primary Examiner* — Wayne Young
*Assistant Examiner* — Thomas Alunkal
(74) *Attorney, Agent, or Firm* — Oblon, Spivak, McClelland, Maier & Neustadt, L.L.P.

(57) ABSTRACT

An evaluation apparatus obtains an evaluation value of a signal read from an optical recording medium includes a reading device reading a signal recorded on the optical recording medium. Edge positions are detected of the read signal acquired by the reading device. A frequency distribution table is generated of the edge positions on the basis of an accumulation result of information of the edge positions detected by the edge position detection device. A first calculation of a T degree value is represented as $$[\{\Sigma fi \times (xi-A)^{(2m+1)}\}/F]^{\{1/(2m+1)\}} \quad \text{Formula 1}$$

(wherein m is a natural number excluding zero)
The variables xi, fi, F, and A represent the value of each of the classes, the frequency of each of the classes, the sum of the frequencies, and the weighted average value, respectively.

15 Claims, 20 Drawing Sheets

EVALUATION APPARATUS, EVALUATION METHOD, AND PROGRAM

CROSS REFERENCES TO RELATED APPLICATIONS

The present invention contains subject matter related to Japanese Patent Application JP 2007-294595 filed in the Japanese Patent Office on Nov. 13, 2007, the entire contents of which are incorporated herein by reference.

BACKGROUND OF THE INVENTION

1. Field of the Invention

The present invention relates to an evaluation apparatus and a method thereof for obtaining an evaluation value of a signal read from an optical recording medium, on which signal reading is performed by application of light. The present invention further relates to a program to be executed by a signal processing apparatus to realize the evaluation apparatus and the evaluation method of the present invention.

2. Description of the Related Art

In the past, the quality evaluation of an optical disc recording medium (hereinafter referred to simply as the optical disc), such as a CD (Compact Disc), a DVD (Digital Versatile Disc), and a BD (Blu-ray Disc: a registered trademark), for example, has been performed with the use of an indicator called jitter which represents in the standard deviation value the variation of edge positions of pits formed on the optical disc. Specifically, a frequency distribution table is generated on the basis of the result of detection of a plurality of edge positions of a signal read from the optical disc, and the standard deviation value of the edge positions is calculated on the basis of the frequency distribution table. An increase in the thus calculated jitter value means an increase in the variation of the edge positions. Conversely, a reduction in the jitter value means a reduction in the variation of the edge positions. That is, if an optical disc has a smaller jitter value, the optical disc can be determined to be a more favorable optical disc having less variation of the edge positions.

The related art includes Japanese Unexamined Patent Application Publication No. 2006-344338.

SUMMARY OF THE INVENTION

However, in high-density optical discs of recent years, particularly such as the BD, it has been becoming clear that the frequency distribution is skewed due to the variation in the manufacturing process and so forth, and that there arise cases in which the skew appears in different forms.

FIGS. 19A, 19B, and 19C are diagrams for explaining the above-described situations. The drawings show the measurement results of the standard deviation of respective optical discs measured by the same measuring machine (evaluation apparatus). Each of the drawings shows both of the measurement result of the standard deviation of the rising edge positions (a solid line) and the measurement result of the standard deviation of the falling edge positions (a broken line).

As shown in these FIGS. 19A to 19C, the frequency distribution of the edge positions is obtained in the shape of an approximately normal distribution (FIG. 19C) or in a skewed shape (FIGS. 19A and 19B), depending on the optical discs. Further, it can be observed that the direction of the thus generated skew varies depending on the optical discs.

Meanwhile, FIGS. 20A, 20B, and 20C show the measurement results of the standard deviation of the same optical disc measured by respective measuring machines. Each of the drawings of 20A to 20C also shows both of the measurement result of the standard deviation of the rising edge positions (a solid line) and the measurement result of the standard deviation of the falling edge positions (a broken line).

It can be understood from the results shown in these FIGS. 20A to 20C that, even if the measurement is performed on the same optical disc, the presence or absence of the skew in the frequency distribution and the direction of the skew may vary, if different measuring machines are employed.

As described above, there arises a phenomenon in which the frequency distribution of the edge positions has different skew forms depending on the difference in characteristic among the optical discs and the difference in characteristic among the measuring machines.

If the skew of the frequency distribution is increased, the signal quality is deteriorated. It is difficult to express such a skew by using the standard deviation value, which is the evaluation value of the related art. Therefore, there may arise a case in which the same value is obtained as the standard deviation value even when there is actually a difference in the magnitude of the skew. With this taken into account, it is difficult to appropriately evaluate the signal quality by using the method of the related art, which uses the standard deviation value as the evaluation indicator.

In the past, therefore, as a method of correcting the difference in the standard deviation values caused by the difference in characteristic among the optical discs or the measuring machines, the measured standard deviation value has been provided with a necessary correction coefficient. Specifically, the correction coefficient is calculated from an equation $y=ax+b$, wherein x and y represent the measured standard deviation value and the correction coefficient to be provided to the measured value, respectively.

However, the above method performs correction focusing only on the measured standard deviation value. Thus, it is difficult to perform correction which takes into account the skew of the frequency distribution as described above. Specifically, it is difficult to solve a phenomenon in which a large difference in the correction coefficient arises when a frequency distribution skewed toward (in the direction of) one polarity and a frequency distribution skewed toward the other polarity are obtained, with a frequency distribution having a skew of zero used as a reference.

Meanwhile, in the field of statistics, the skewness ($\gamma 1$) calculated from the following equation has been known as an indicator representing the skew of the frequency distribution. In the following equation, xi, fi, F, and A represent the value of each of the classes of the frequency distribution table, the frequency of each of the classes, the sum of the frequencies, and the weighted average value, respectively.

$$\gamma 1 = [\{\Sigma fi \times (xi-A)^3\}/F]/\sigma^3 \qquad \text{Formula 1}$$

The skewness $\gamma 1$ is a measure representing the degree of asymmetrical distribution of data around the average value, and is also referred to as the asymmetry degree. The skewness $\gamma 1$ can express the degree of deformation of the frequency distribution.

However, the skewness $\gamma 1$ is ultimately obtained by the division using the standard deviation value. Thus, this method has a problem in that the smaller (the more favorable) the deviation is, the greater (the worse) the skewness value becomes. In this regard, it is difficult to appropriately express the skew of the frequency distribution by using the skewness $\gamma 1$.

The present invention has been made in light of the above-identified problems. Thus, it is desirable to use the skew of the frequency distribution of the edge positions as the signal quality evaluation indicator to enable appropriate signal quality evaluation which takes into account the skew of the frequency distribution attributed to the difference in characteristic among the optical recording media or the measuring machines.

An evaluation apparatus according to an embodiment of the present invention is an evaluation apparatus for obtaining an evaluation value of a signal read from an optical recording medium, and includes the following means. That is, the evaluation apparatus includes reading means for reading a signal recorded on the optical recording medium, and edge position detection means for detecting edge positions of the read signal acquired by the reading means. Further, the evaluation apparatus includes frequency distribution table generation means for generating a frequency distribution table of the edge positions on the basis of accumulation result of information of the edge positions detected by the edge position detection means. Furthermore, the evaluation apparatus includes first calculation means for calculating the value of a T degree represented as $$[\{\Sigma fi \times (xi-A)^{(2m+1)}\}/F]^{\{1/(2m+1)\}} \quad \text{Formula 2}$$

(wherein m is a natural number excluding zero) wherein, in the frequency distribution table generated by the frequency distribution table generation means, xi, fi, F, and A represent the value of each of the classes, the frequency of each of the classes, the sum of the frequencies, and the weighted average value, respectively.

Further, an evaluation method according to an embodiment of the present invention is an evaluation method for obtaining an evaluation value of a signal read from an optical recording medium, and includes the following steps. That is, the evaluation method includes a step of generating a frequency distribution table of edge positions on the basis of accumulation result of information of the edge positions detected from the read signal acquired by the reading of a signal recorded on the optical recording medium. Further, the evaluation method includes a step of calculating a T degree value represented as $$[\{\Sigma fi \times (xi-A)^{(2m+1)}\}/F]^{\{1/(2m+1)\}} \quad \text{Formula 2}$$

(wherein m is a natural number excluding zero) wherein, in the frequency distribution table generated by the frequency distribution table generation step, xi, fi, F, and A represent the value of each of the classes, the frequency of each of the classes, the sum of the frequencies, and the weighted average value, respectively.

Further, a program according to an embodiment of the present invention is a program to be executed by a signal processing apparatus to obtain an evaluation value of a signal read from an optical recording medium. The program causes the signal processing apparatus to perform the following processes. That is, the program causes the signal processing apparatus to perform a frequency distribution table generation process of generating a frequency distribution table of edge positions on the basis of accumulation result of information of the edge positions detected from the read signal acquired by the reading of a signal recorded on the optical recording medium, and a first calculation process of calculating a T degree value represented as $$[\{\Sigma fi \times (xi-A)^{(2m+1)}\}/F]^{\{1/(2m+1)\}} \quad \text{Formula 2}$$

(wherein m is a natural number excluding zero) wherein, in the frequency distribution table generated by the frequency distribution table generation process, xi, fi, F, and A represent the value of each of the classes, the frequency of each of the classes, the sum of the frequencies, and the weighted average value, respectively.

Herein, the value of (xi−A) is raised to the power of an odd number in the T degree. Therefore, the T degree can express the skew of the frequency distribution (a histogram) together with the direction of the skew.

Further, unlike the skewness $\gamma 1$ of the related art, the T degree does not involve the division using the standard deviation value. Therefore, the T degree does not have the program of an increase in value thereof caused by a reduction in the deviation. In this regard, the T degree can more accurately express the degree of the skew of the frequency distribution.

According to the present invention, the value of the T degree is calculated which can correctly express the skew direction and the skew degree of the frequency distribution of the edge positions. Accordingly, appropriate signal quality evaluation can be performed which takes into account the skew of the frequency distribution of the edge positions attributed to the difference in characteristic among the optical recording media or the measuring machines.

DESCRIPTION OF THE PREFERRED EMBODIMENTS

Description will be made below of preferred embodiments (hereinafter referred to as the embodiments) for implementing the present invention.

First Embodiment

Figure 1:
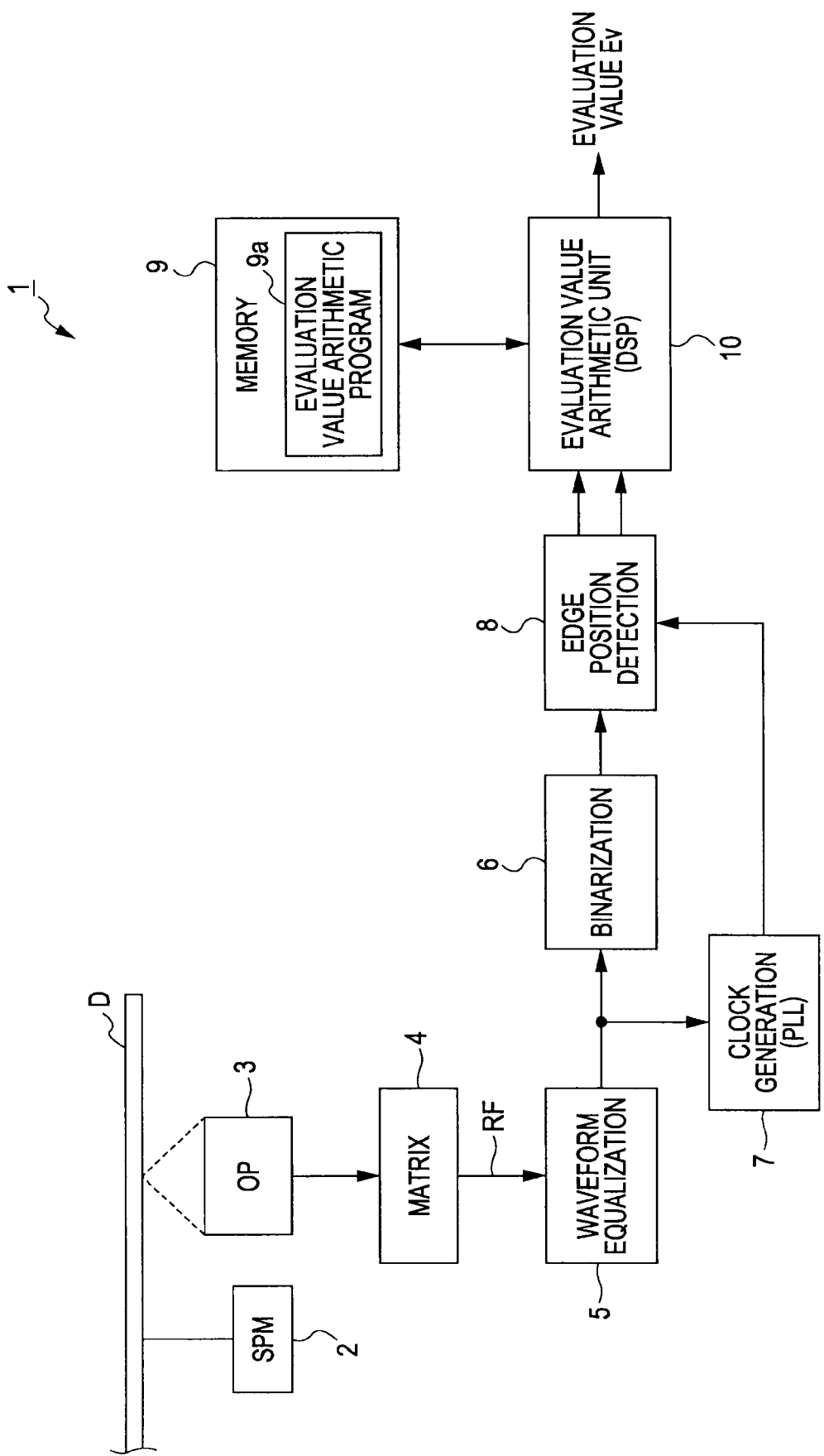
FIG. 1 is a block diagram illustrating an internal configuration of an evaluation apparatus of an embodiment of the present invention.

Overall configuration of evaluation apparatus: FIG. 1 is a block diagram illustrating an internal configuration of an evaluation apparatus 1, which is an evaluation apparatus according to an embodiment of the present invention.

In FIG. 1, the evaluation apparatus 1 of the present embodiment is configured to be able to read a signal from an optical disc recording medium (hereinafter referred to simply as the optical disc), such as a CD (Compact Disc), a DVD (Digital Versatile Disc), and a BD (Blu-ray Disc: a registered trademark), for example, which is an optical recording medium applied with light to read a signal therefrom. An example is presented herein in which an optical disc D of the drawing handled by the evaluation apparatus 1 is the BD, for example. The BD is subjected to signal reading with laser light having a wavelength λ of 405 nm and an objective lens having a numerical aperture NA of 0.85.

In FIG. 1, upon installation in the evaluation apparatus 1, the optical disc D is mounted on a not-illustrated turntable and driven to rotate at a constant linear velocity (CLV), for example, by a spindle motor (SPM) 2.

Then, the optical disc D thus driven to rotate is subjected to the signal reading by an optical pickup (OP) 3.

Although illustration is omitted, a laser diode serving as a laser light source, a photodetector for detecting reflected light, an objective lens for defining an output end of laser light, an optical system for applying the laser light to a disc recording surface via the objective lens and guiding the resultant reflected light to the photodetector, and so forth are formed inside the optical pickup 3.

Further, inside the optical pickup 3, the objective lens is held by a biaxial mechanism to be movable in the tracking direction and the focusing direction. Further, the optical pickup 3 is made movable in the radial direction of the optical disc D by a thread mechanism.

The information of the reflected light from the optical disc D is detected by the photodetector, converted into an electrical signal according to the received light amount, and supplied to a matrix circuit 4.

The matrix circuit 4 includes a current-voltage conversion circuit, a matrix operation-amplification circuit, and so forth in accordance with current output from a plurality of light-receiving elements forming the photodetector. The matrix circuit 4 generates a necessary signal by performing matrix operation processing.

For example, the matrix circuit 4 generates such signals as an RF (Radio Frequency) signal (a reproduced data signal) corresponding to reproduced data, a focus error signal for servo control, and a tracking error signal. The matrix circuit 4 can also generate a push-pull signal as a signal relating to the wobbling of a groove, i.e., a signal for detecting the wobbling.

Although illustration is omitted, the focus error signal and tracking error signal are supplied to a not-illustrated servo circuit. Then, on the basis of these error signals, the servo circuit performs drive control of the aforementioned biaxial mechanism provided inside the optical pickup 3. Thereby, a variety of servo control operations, such as focus servo control and tracking servo control, are realized.

The reproduced data signal (the RF signal) output from the matrix circuit 4 is supplied to a waveform equalization circuit 5, subjected to predetermined waveform equalization processing, and thereafter supplied to each of a binarization circuit 6 and a clock generation circuit 7.

The binarization circuit 6 performs binarization processing on the reproduced data signal, and supplies a resultant binarized signal to an edge position detection circuit 8.

Meanwhile, the clock generation circuit 7 generates a reproduced clock signal by performing PLL (Phase Locked Loop) processing, and supplies the reproduced clock signal to the edge position detection circuit 8.

The edge position detection circuit 8 detects the edge positions of the binarized signal. In the present case, the edge position detection circuit 8 separately detects the rising edge positions and the falling edge positions of the binarized signal. The information of the detected rising edge positions and the information of the detected falling edge positions are respectively supplied to an evaluation value arithmetic unit 10.

For the sake of confirmation, the information of the edge positions is the information representing the edge positions of the binarized signal within one clock portion of the reproduced clock signal.

The evaluation value arithmetic unit 10 performs an arithmetic operation of the embodiment described later to calculate an evaluation value Ev, which is an indicator for evaluating the quality of the signal read from the optical disc D. In the present case, the evaluation value arithmetic unit 10 is formed by a DSP (Digital Signal Processor), and the arithmetic operation for calculating the evaluation value Ev is realized by programming of the DSP.

Specifically, in the present example, the arithmetic operation by the evaluation value arithmetic unit 10 functioning as the DSP is realized as the evaluation value arithmetic unit 10 performs digital signal processing based on an evaluation value arithmetic program 9a stored in a memory 9.

Problem of evaluation value of related art: Herein, as previously described, the standard deviation (σ) of the signal edge positions has been calculated in the part as the quality evaluation indicator of the signal read from the optical disc D.

For the sake of confirmation, the standard deviation σ is calculated from the following Equation 1, wherein xi, fi, F, and A represent the value of each of the classes of the frequency distribution table, the frequency of each of the classes, the sum of the frequencies, and the weighted average value, respectively. The weighted average value A is obtained by multiplying, for each of the classes, the value xi of the class by the frequency fi of the class and dividing the sum of the multiplication results by the sum F of the frequencies.

Formula 3

$$\sigma = \sqrt{\{\Sigma fi \times (xi-A)^2\}/F} \qquad \text{Equation 1}$$

However, it is difficult to express the skew of the frequency distribution of the edge positions, which is caused by the difference in characteristic among the optical discs D or the measuring machines (the evaluation apparatuses 1), by using the above-described standard deviation σ.

A first embodiment, therefore, proposes a new and unprecedented evaluation indicator to obtain a more appropriate signal quality evaluation indicator which takes into account the skew of the frequency distribution as described above.

First Example of First Embodiment

The first embodiment proposes, as the above-described new evaluation indicator, an evaluation indicator of T deviation.

Herein, as previously described, the indicator called skewness σ1 has been known in statistics to express the skew of the frequency distribution. However, the skewness σ1 is ultimately obtained by the division using the standard deviation value σ, and thus has a problem in that the skewness value is increased as the deviation is reduced.

In view of the above, the present example proposes the indicator called T degree as a new indicator expressing the degree of the skew. In the present example, a T degree τ expressed by the following Equation 2 is calculated as the T degree.

Formula 4

$$\tau = [\{\Sigma fi \times (xi-A)^3\}/F]^{1/3} \qquad \text{Equation 2}$$

In the T degree τ, the value of (xi−A) is raised to the third power (raised to the power of an odd number). Therefore, the T degree τ can express the skew of the frequency distribution (a histogram) together with the direction of the skew.

Further, to return the value back to the original dimension, the cubed value is raised to the one-third power, unlike the above-described skewness γ1 in which the cubed value is divided by the cubed value of the standard deviation σ. Therefore, the value of the T degree τ is not increased when the deviation is reduced, unlike the skewness γ1. In this regard, the T degree τ can realize an evaluation indicator capable of more accurately expressing the skew degree.

The value of the T degree τ can be used alone as the evaluation indicator for expressing the degree of the skew of the frequency distribution (the degree of tilt of the histogram) together with the direction of the skew. In the present case, however, the T degree τ is configured to be able to also express the degree of distribution of the edge positions as the evaluation indicator of the edge positions.

In the present example, therefore, the value of the T degree τ is multiplied by the value of the standard deviation σ to realize an evaluation indicator capable of also expressing the degree of distribution of the frequencies as well as the degree of the skew (and the direction of the skew) of the frequency distribution. That is, the above-described evaluation indicator is newly proposed as T deviation, which is represented as τ×σ.

In a first example of the first embodiment, the value of the T deviation is calculated as the evaluation value Ev for evaluating the quality of the signal read from the optical disc D.

Figure 2:
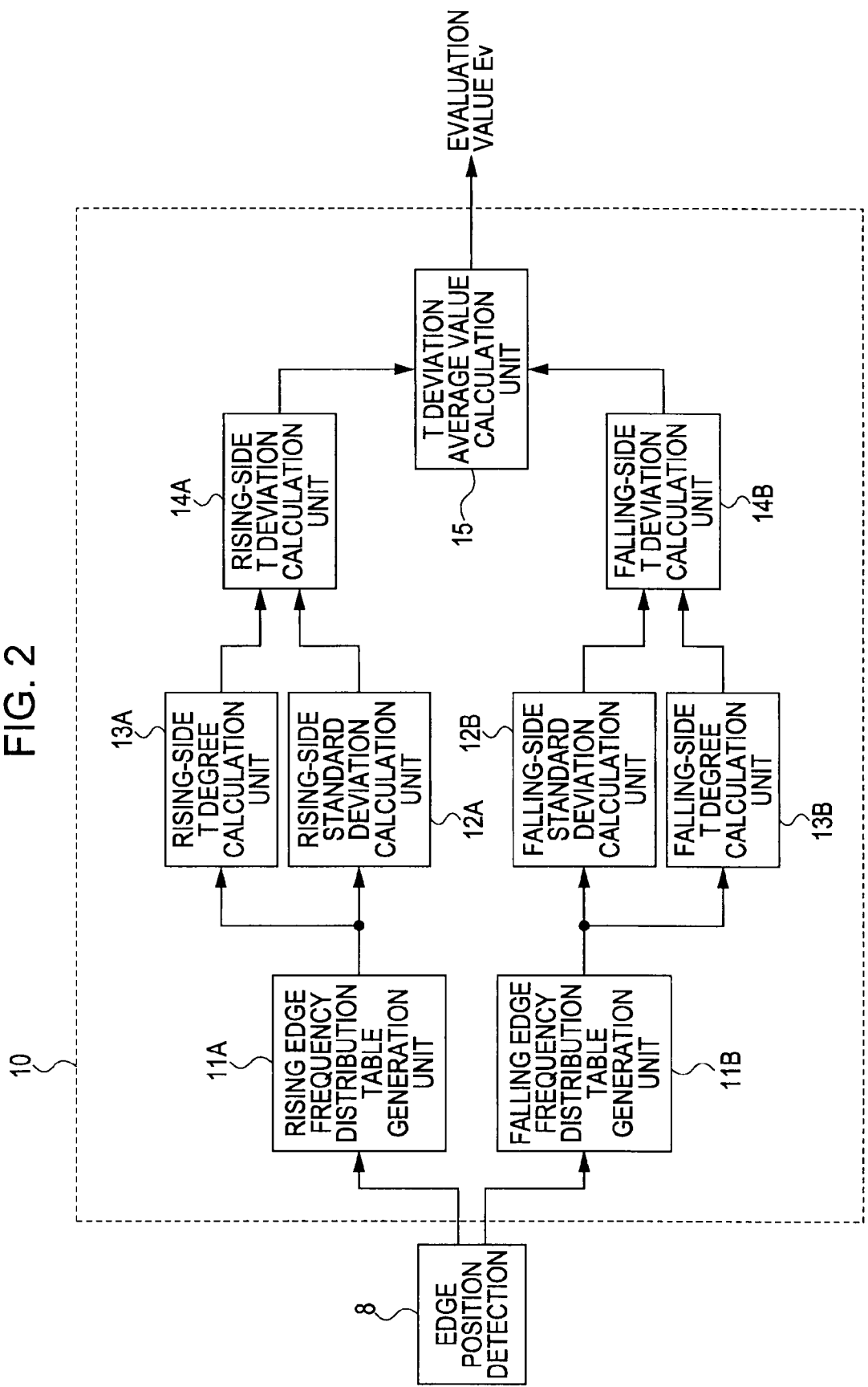
FIG. 2 is a diagram for explaining a configuration for realizing the operation of a first example of a first embodiment.

Configuration for calculating T deviation: FIG. 2 is a diagram for explaining a configuration for calculating the value of the T deviation. The drawing illustrates in blocks respective functional operations realized by the evaluation value arithmetic unit 10 illustrated in FIG. 1. That is, the drawing illustrates in blocks the respective functional operations realized by the digital signal processing performed by the evaluation value arithmetic unit 10, which functions as the DSP, on the basis of the evaluation value arithmetic program 9a illustrated in FIG. 1.

In the following description, for the convenience of explanation, the respective function blocks are treated as hardware for performing the respective functional operations. Further, FIG. 2 also illustrates the edge position detection circuit 8 illustrated in FIG. 1.

In FIG. 2, the evaluation value arithmetic unit 10 includes a rising edge frequency distribution table generation unit 11A, a falling edge frequency distribution table generation unit 11B, a rising-side standard deviation calculation unit 12A, a falling-side standard deviation calculation unit 12B, a rising-side T degree calculation unit 13A, a falling-side T degree calculation unit 13B, a rising-side T deviation calculation unit 14A, a falling-side T deviation calculation unit 14B, and a T deviation average value calculation unit 15.

Herein, as described in the foregoing FIG. 1, it is assumed in the embodiment that the rising edge positions and the falling edge positions are separately detected. In accordance with this, the average value of the absolute values of the respective values calculated separately for the rising edge side and the falling edge side is calculated as the T deviation ultimately obtained as the evaluation value Ev.

In FIG. 2, the rising edge frequency distribution table generation unit 11A accumulates the information of the rising edges of the binarized signals sequentially detected and supplied by the edge position detection circuit 8, which is illustrated also in FIG. 1. On the basis of the result of the accumulation, the rising edge frequency distribution table generation unit 11A generates a frequency distribution table (showing the frequency for each of the classes) of the rising edge positions.

The rising-side standard deviation calculation unit 12A performs the calculation of the foregoing Equation 1 on the basis of the frequency distribution table generated by the rising edge frequency distribution table generation unit 11A, to thereby calculate the standard deviation σ of the rising edge positions. The standard deviation σ calculated by the rising-side standard deviation calculation unit 12A will be hereinafter described as σ1 to be distinguished from the value of the standard deviation σ calculated by the falling-side standard deviation calculation unit 12B.

The rising-side T degree calculation unit 13A performs the calculation of the foregoing Equation 2 on the basis of the frequency distribution table generated by the rising edge frequency distribution table generation unit 11A, to thereby calculate the T degree τ of the rising edge positions (hereinafter described as τ1).

The rising-side T deviation calculation unit 14A multiplies the T degree value τ1 of the rising edge positions, which has been calculated by the rising-side T degree calculation unit 13A, by the standard deviation value σ1 of the rising edge positions, which has been calculated by the rising-side standard deviation calculation unit 12A, to thereby calculate the T deviation value of the rising edge positions.

Meanwhile, as for the falling edge side, the falling edge frequency distribution table generation unit 11B accumulates the information of the falling edges of the binarized signals sequentially detected and supplied by the edge position detection circuit 8. On the basis of the result of the accumulation, the falling edge frequency distribution table generation unit 11B generates a frequency distribution table of the falling edge positions.

The falling-side standard deviation calculation unit 12B performs the calculation of the foregoing Equation 1 on the basis of the frequency distribution table generated by the falling edge frequency distribution table generation unit 11B, to thereby calculate the standard deviation σ of the falling edge positions (hereinafter described as σ2).

Further, the falling-side T degree calculation unit 13B performs the calculation of the foregoing Equation 2 on the basis of the frequency distribution table generated by the falling edge frequency distribution table generation unit 11B, to thereby calculate the T degree τ of the falling edge positions (hereinafter described as τ2).

The falling-side T deviation calculation unit 14B multiplies the T degree value τ2 of the falling edge positions, which has been calculated by the falling-side T degree calculation unit 13B, by the standard deviation value σ2 of the falling edge positions, which has been calculated by the falling-side standard deviation calculation unit 12B, to thereby calculate the T deviation value of the falling edge positions.

The T deviation average value calculation unit 15 averages the absolute values of the T deviations calculated by the rising-side T deviation calculation unit 14A and the falling-side T deviation calculation unit 14B, respectively, to thereby calculate the average T deviation value. The average T deviation value is output as the evaluation value Ev.

Second Example of First Embodiment

In the first example of the first embodiment described above, the average of the absolute value of the T deviation of the rising edge positions and the absolute value of the T deviation of the falling edge positions is calculated as the evaluation value Ev. To further improve the sensitivity of the evaluation value, a second example of the first embodiment is configured to be able to perform evaluation including evaluation of the sameness between the histogram shape of the rising edges and the histogram shape of the falling edges.

In the second example, therefore, a balance degree β is calculated from the following Equation 3 to evaluate the above-described sameness between the histogram shapes. In Equation 3, f1i and F1 represent the frequency of each of the classes in the frequency distribution table of the rising edge positions and the sum of the frequencies, respectively. Further, f2i and F2 represent the frequency of each of the classes in the frequency distribution table of the falling edge positions and the sum of the frequencies, respectively. Further, k represents an arbitrary coefficient.
Formula 5

$$\beta = k \times \sqrt{\{\Sigma(f1i - f2i)^2\}/(F1+F2)}$$  Equation 3

The balance degree β can realize an evaluation indicator which is increased along with an increase in the degree of non-correspondence between the histogram shape of the rising edge positions and the histogram shape of the falling edge positions, and which is reduced along with an increase in the degree of correspondence between the histogram shapes. That is, the sameness between the histogram shapes can be evaluated with the use of the evaluation indicator.

Further, to enable the evaluation of the signal quality including the evaluation of the above-described sameness between the histogram shapes, the second example calculates an evaluation value called balanced T deviation by multiplying the value of the T deviation by the value of the balance degree β. That is, the balanced T deviation is represented as an equation T deviation×β=σ×τ×β.

If the value of the T deviation is thus multiplied by the balance degree β, the value of the T deviation can be weighted such that the value thereof is increased (deteriorated) as the difference between the histogram shapes is increased. That is, the above-described balanced T deviation can provide a more appropriate signal quality evaluation indicator for performing the evaluation including the evaluation of the sameness between the histogram shapes.

Figure 3:
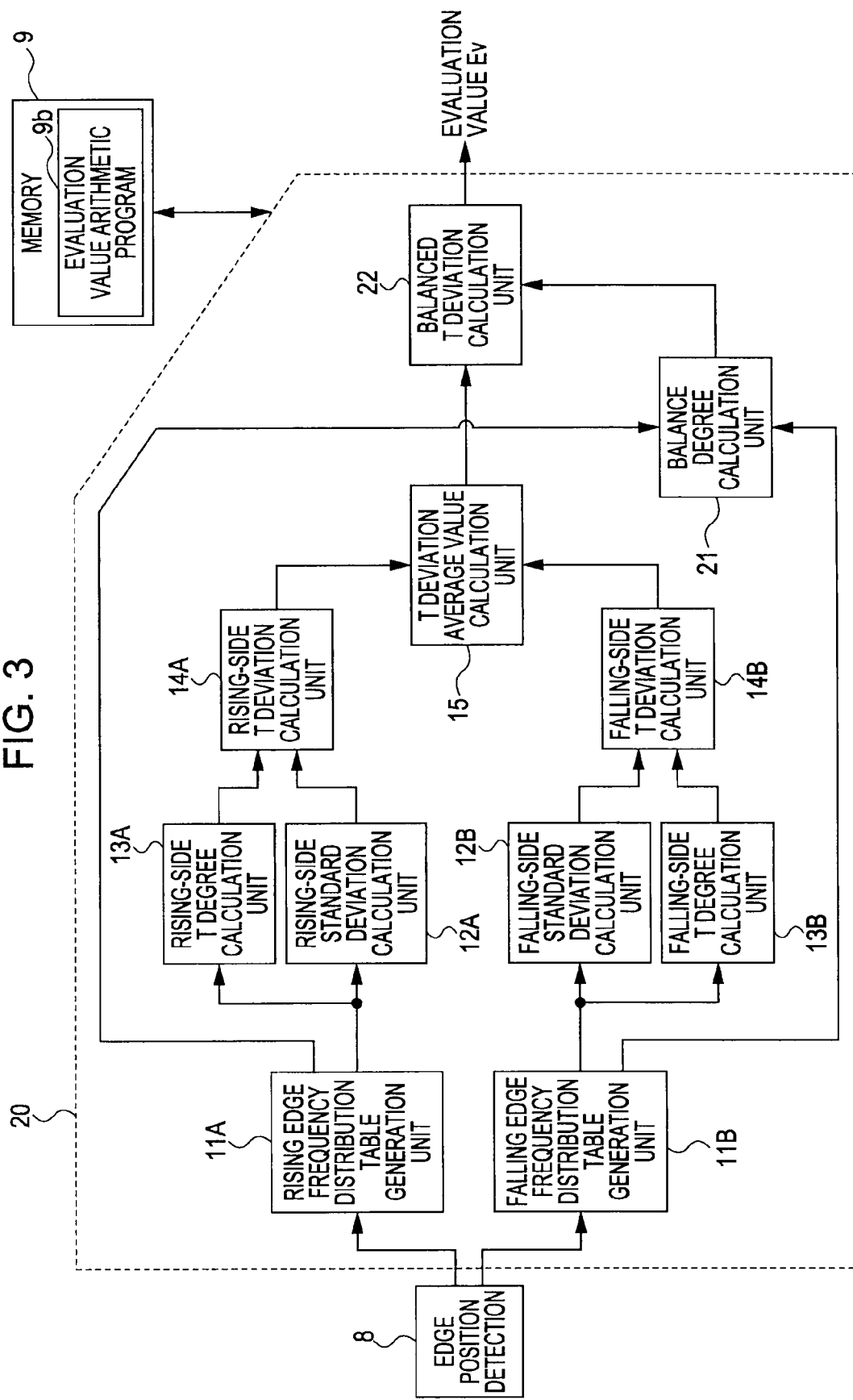
FIG. 3 is a diagram for explaining a configuration for realizing the operation of a second example of the first embodiment.

Configuration for calculating balanced T deviation: FIG. 3 is a diagram for explaining a configuration for realizing the operation of the second example of the first embodiment. Similarly to the foregoing FIG. 2, FIG. 3 illustrates in blocks respective functional operations realized by digital signal processing performed by an evaluation value arithmetic unit 20 (DSP) included in the evaluation apparatus 1 of the second example.

In the present example, the overall configuration of the evaluation apparatus 1 is similar to the configuration illustrated in the foregoing FIG. 1. Thus, another description of the configuration will be omitted. In the present case, the evaluation value arithmetic unit 20 is provided to replace the evaluation value arithmetic unit 10. Further, in the present case, the operation of calculating the balanced T deviation is performed by the digital signal processing by the evaluation value arithmetic unit 20. Thus, the memory 9 stores an evaluation value arithmetic program 9b in place of the evaluation value arithmetic program 9a described in the foregoing first example.

In the evaluation value arithmetic unit 20 of the second example, the configuration for calculating the T deviation (the configuration up to the T deviation average value calculation unit 15) is similar to the configuration described in the foregoing FIG. 2. Thus, another description of the configuration will be omitted.

In the present case, a balance degree calculation unit 21 is additionally provided which calculates the balance degree β on the basis of the frequency distribution table of the rising edge positions generated by the rising edge frequency distribution table generation unit 11A and the frequency distribution table of the falling edge positions generated by the falling edge frequency distribution table generation unit 11B. Specifically, the balance degree calculation unit 21 calculates the balance degree β by performing the calculation of the foregoing Equation 3 on the basis of the information of the frequency f1i of each of the classes in the frequency distribution table of the rising edge positions and the sum F1 of the frequencies and the information of the frequency f2i of each of the classes in the frequency distribution table of the falling edge positions and the sum F2 of the frequencies.

Further, a balanced T deviation calculation unit 22 is provided which calculates the value of the balanced T deviation by multiplying the average T deviation value, which has been calculated by the T deviation average value calculation unit 15, by the balance degree value β, which has been calculated by the balance degree calculation unit 21. In the second example, the balanced T deviation value calculated by the balanced T deviation calculation unit 22 is output as the evaluation value Ev.

Figure 4:
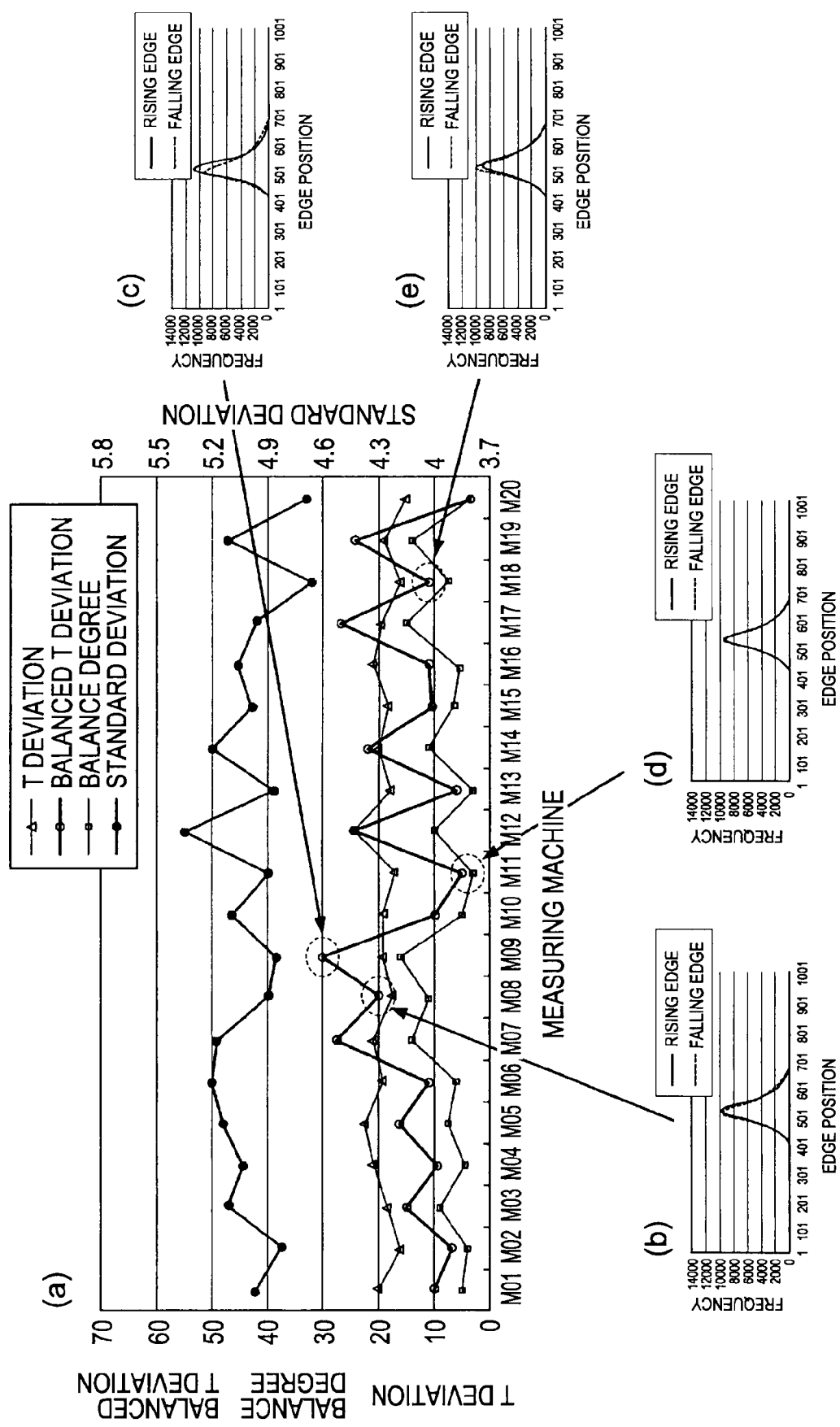
FIG. 4 is a diagram for explaining the results of evaluation actually performed with the use of evaluation values of the first and second examples of the first embodiment, mainly showing the evaluation results of the same disc evaluated by respective measuring machines.
Figure 5:
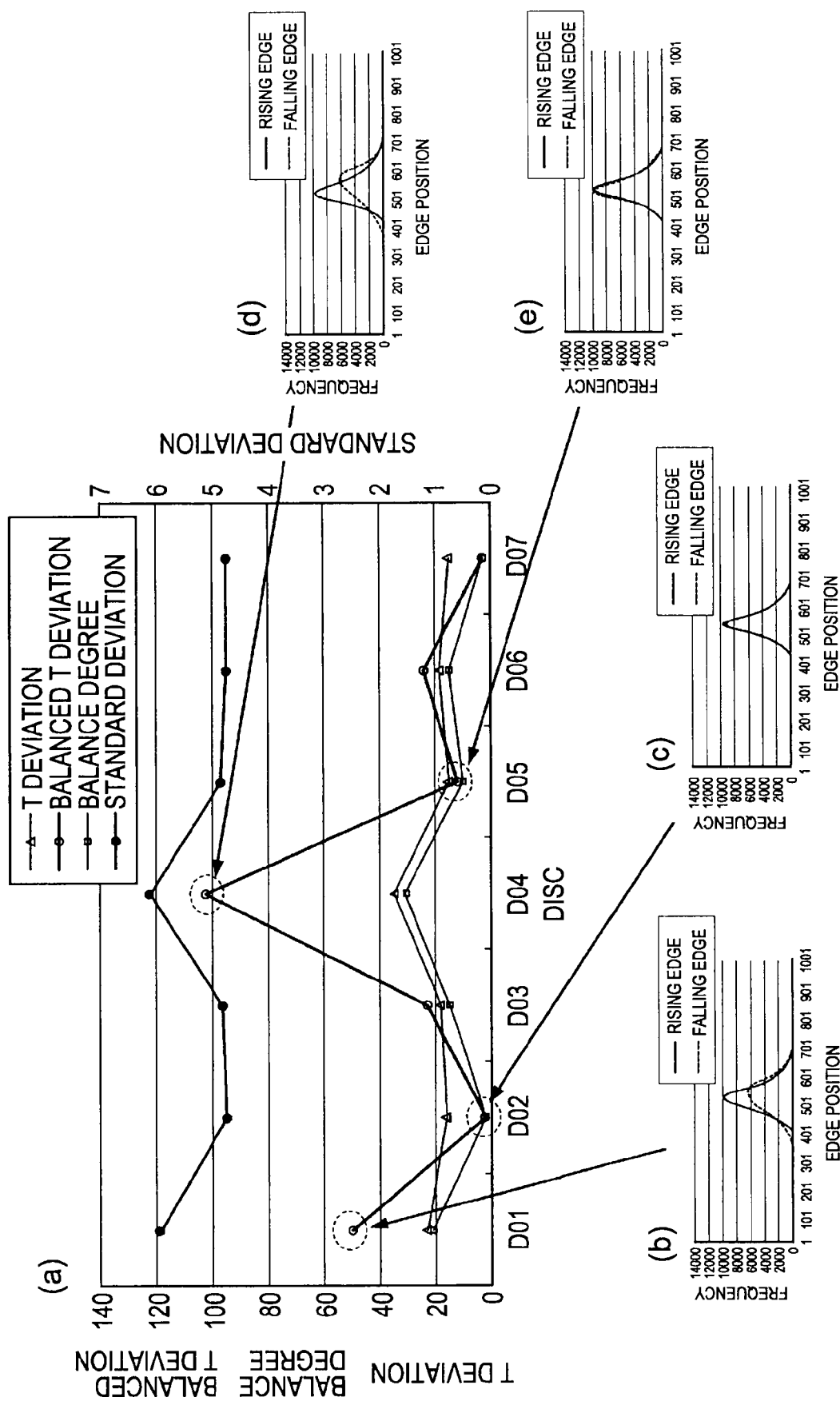
FIG. 5 is a diagram for explaining the results of evaluation actually performed with the use of the evaluation values of the first and second examples of the first embodiment, mainly showing the evaluation results of respective discs evaluated by the same measuring machine.

Actual evaluation results: FIGS. 4 and 5 are diagrams for explaining the results of evaluation actually performed with the use of the evaluation values of the first and second examples of the first embodiment. FIG. 4(a) shows evaluation results of the same optical disc D evaluated by respective measuring machines (respective evaluation apparatuses 1). FIG. 5(a) shows evaluation results of respective optical discs D evaluated by the same measuring machine. In the drawings, each of diagrams (b) to (e) shows the frequency distribution of the rising edge positions (a solid line) and the frequency distribution of the falling edge positions (a broken line) at a corresponding circled point (the measuring machine or the optical disc D) in the diagram (a).

FIG. 4(a) shows calculation results of the T deviation (a white triangle), the balanced T deviation (a white circle), and the balance degree (a white square) of the respective measuring machines (M01 to M20). FIG. 5(a) shows calculation results of the T deviation (a white triangle), the balanced T deviation (a white circle), and the balance degree (a white square) of the respectively different optical discs D (D01 to D07). For comparison, the drawings also show calculation results of the standard deviation (a black circle).

Firstly, as for the T deviation, it is can be observed from the measurement results of the measuring machines M08 and M09 in FIG. 4(a) that the standard deviation value is substantially reduced (improved) while the T deviation value remains approximately on the same level. Further, it can be observed from the measurement result of the optical disc D06 in FIG. 5(a) that the standard deviation value is reduced while the T deviation value is increased.

With reference to the histogram shapes obtained by the measuring machines M08 and M09 of FIG. 4 (FIGS. 4(b) and 4(c)), the generation of a relatively large skew (particularly on the falling edge side) is in fact shown. Therefore, it can be understood from this that the T deviation enables more appropriate signal quality evaluation which takes into account the skew of the frequency distribution.

Further, as for the balanced T deviation, it can be observed from the measurement results of the measuring machines M09 and M17 of FIG. 4 that the standard deviation value is reduced while the balanced T deviation value is increased. Particularly in the measurement result of the measuring machine M09, a substantial difference from the standard deviation value is generated. With reference to FIG. 4(c), which shows the histogram shapes obtained by the measuring machine M09, it can be observed that a substantial difference in the histogram shape is generated between the rising edge side and the falling edge side.

Further, as for the optical discs D01 and D04 in FIG. 5, the histogram shape is crushed particularly on the falling edge side in the measurement results of these optical discs D, as shown in FIGS. 5(b) and 5(d). Therefore, an increase in the standard deviation value is expected. With reference to FIG. 5(a), however, it can be observed that the balanced T deviation value is more increased than the standard deviation value as for the optical discs D01 and D04.

It can be understood from the above that the balanced T deviation realizes the evaluation indicator capable of performing more appropriate signal quality evaluation including the evaluation of the sameness between the histogram shape of the rising edges and the histogram shape of the falling edges.

Further, the difference between the balanced T deviation value of each of the measuring machines M11 and M18, which has a small skew in the frequency distribution and substantial sameness in the histogram shape between the rising side and the falling side, as shown in FIGS. 4(d) and 4(e), and the balanced T deviation value of the measuring machine M09, which has a large skew in the frequency distribution and a large difference in the histogram shape between the rising side and the falling side, is larger than the difference between the standard deviation values seen in the same comparison. Further, in FIG. 5, the difference between the balanced T deviation value of each of the optical discs D02 and D05, which has a small skew in the frequency distribution and substantial sameness in the histogram shape between the rising side and the falling side, as shown in FIGS. 5(c) and 5(e), and the balanced T deviation value of the optical disc D04, which has a large skew in the frequency distribution and a large difference in the histogram shape between the rising side and the falling side, is larger than the difference between the standard deviation values seen in the same comparison. It can be understood from the above observations that the sensitivity of the evaluation value is more improved in the balanced T deviation value than in the standard deviation value.

With the sensitivity of the evaluation value thus improved, the evaluation can be performed more precisely than in the evaluation using the standard deviation of the related art. Accordingly, the sensitivity of the quality control of the optical disc D can also be improved.

Application of evaluation value: The evaluation value Ev calculated by the evaluation apparatus 1 of the first embodiment can be used as the evaluation indicator for the quality control of the optical disc D, which is a read-only ROM (Read-Only Memory) disc having pit shapes transferred thereon by a stamper or the like, for example. That is, as shown in FIG. 5, the evaluation value Ev is calculated for each of the different optical discs D by each of the measuring machines. Then, determination is made on whether or not the evaluation value Ev is equal to or less than a predetermined threshold value to determine whether or not each of the optical discs D satisfies a reference quality.

Alternatively, the evaluation value Ev can also be used as an indicator representing the degree of variation of other individual measuring machines with respect to a reference measuring machine (a reference machine). That is, in such a case, the evaluation value Ev is calculated for the same optical disc D by the respective measuring machines (the evaluation apparatuses 1), as in the foregoing FIG. 4. Then, the variation of the respective evaluation values Ev calculated by the other evaluation apparatuses 1 with respect to the evaluation value Ev calculated by the evaluation apparatus 1 serving as the reference machine is examined.

Accordingly, it is possible to know the value of calculation error in the evaluation value Ev calculated by each of the measuring machines with respect to the evaluation value Ev calculated by the reference machine, which is attributed to the difference in characteristic among the measuring machines. Further, in accordance with the error result, a measure can be taken to suppress the evaluation error in each of the measuring machines. Specifically, if the evaluation value Ev is provided with a correction value, the correction value can be determined. Further, determination of whether or not the correction is necessary can also be performed.

Alternatively, the evaluation value Ev can also be used for the purpose of improving the variation in characteristic among the measuring machines. For example, optical units (e.g., the entire optical pickups 3) which are substantially the same in the evaluation value Ev calculated for the same optical disc are previously selected, and the thus selected optical units are installed in the respective measuring machines.

Alternatively, it is also possible to sequentially replace the individual components forming the optical unit and calculate the evaluation value Ev in every replacement of each of the components, to thereby identify the component causing the variation among the measuring machines on the basis of the result of the calculation. The cause of the variation can be identified by the analysis of the causative component. Further, if the component is improved on the basis of the result of the analysis and installed in the optical unit, it is possible to prevent the variation among the measuring machines, and to prevent the calculation error.

Second Embodiment

A second embodiment does not propose a new evaluation indicator, unlike the first embodiment. Instead, the second embodiment uses, as the evaluation indicator, the standard deviation σ similarly to the related art. However, the second embodiment provides the value of the standard deviation σ with a correction coefficient which takes into account the influence of the skew of the frequency distribution to enable more appropriate evaluation.

In the second embodiment, the overall configuration of the evaluation apparatus 1 is similar to the configuration illustrated in the foregoing FIG. 1. Thus, another description of the configuration will be omitted.

Further, for the sake of confirmation, in the evaluation method using the standard deviation σ according to the second embodiment as described above, the evaluation of the rising edge side and the evaluation of the falling edge side are performed independently of each other. That is, as the evaluation value Ev, the rising-side evaluation value Ev (hereinafter referred to as Ev-1) and the falling-side evaluation value Ev (hereinafter referred to as Ev-2) are separately calculated.

First example: A first example of the second embodiment switches the correction coefficient to be provided to the standard deviation σ in accordance with the sign of the T degree τ calculated from the foregoing Equation 2.

Herein, as a result of an experiment performed on the standard deviation and the T degree calculated for the same optical disc D by the reference machine and the respective measuring machines, the present applicant found that the standard deviation and the T degree have the following correction. That is, the result of calculation of the standard deviation value preformed for the same optical disc D by the reference machine and the other measuring machines revealed that, if the standard deviation value calculated by one of the measuring machines is smaller than the standard deviation value calculated by the reference machine, the T degree value calculated for the optical disc D has the minus sign (polarity) in most cases, and that, if the standard deviation value calculated by one of the measuring machines is conversely larger than the standard deviation value calculated by the reference machine, the T degree value calculated for the optical disc D has the plus sign in most cases.

Figure 6:
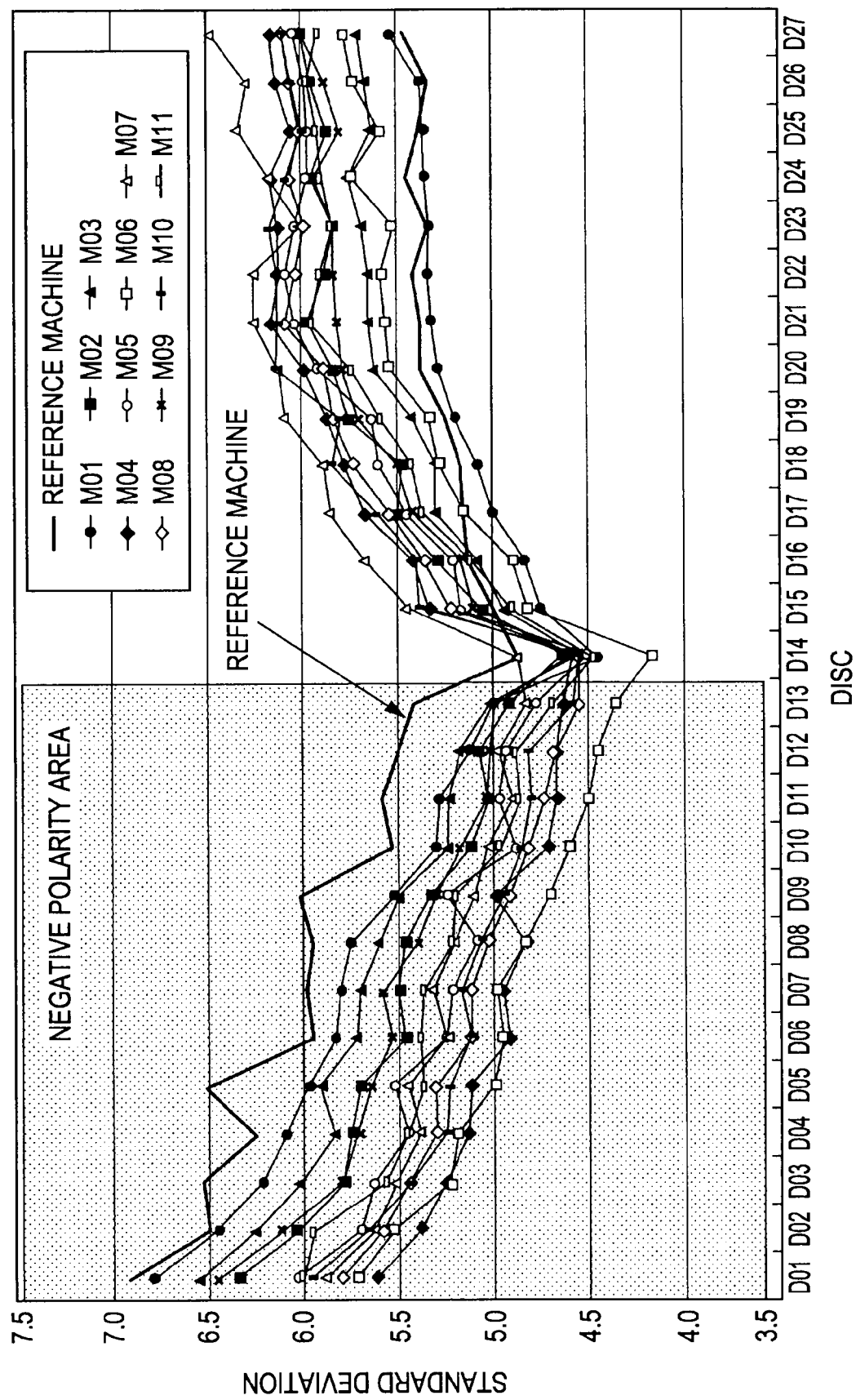
FIG. 6 is a diagram showing experiment results representing the correlation between the standard deviation and the T degree, particularly showing calculation results of the standard deviation calculated by a reference machine and other measuring machines for each of discs.

FIG. 6 is a diagram showing experiment results representing the above-described correlation between the standard deviation and the T degree. The drawing shows calculation results of the standard deviation σ calculated for the same optical discs D (D01 to D27) by the reference machine and the other measuring machines. In FIG. 6, the calculation result of the reference machine is indicated by a bold solid line, while the calculation results of the other measuring machines are indicated by respective fine solid lines.

Herein, the T degree τ of the embodiment includes a component in which the difference between the value xi of each of the classes of the frequency distribution table and the weighted average value A is raised to the third power (raised to the power of an odd number). Thus, the T degree τ has a sign. In FIG. 6, to visually clarify the correlativity between the T degree τ and the standard deviation σ, the calculation results of the standard deviation σ of the optical discs D for which the T degree τ has the minus sign are grouped together on the left side of the drawing.

As is obvious from this FIG. 6, the calculation results of the standard deviation σ calculated for the same optical disc D by the reference machine and the respective measuring machines reveal that, if the standard deviation value ν calculated for the optical disc D is smaller than the standard deviation value σ calculated by the reference machine, the T degree τ has the minus sign in most cases, and that, if the standard deviation value σ calculated for the optical disc D is conversely larger than the standard deviation value σ calculated by the reference machine, the T degree τ has the plus sign in most cases.

From the standpoint of the T degree τ, this means that, if the calculated T degree τ has the minus sign, the calculated standard deviation value σ is smaller than the standard deviation value σ of the reference machine in most cases, and that, if the calculated T degree τ conversely has the plus sign, the calculated standard deviation value σ is larger than the standard deviation value σ of the reference machine in most cases.

Herein, as previously described, the correction has been performed in the past by calculating the correction coefficient from the linear expression y=ax+b, wherein x and y represent the standard deviation value and the correction coefficient, respectively, and providing the correction coefficient to the standard deviation value. The results shown in FIG. 6, however, suggest that it is difficult to perform appropriate correction by using the above-described method of the related art which calculates the correction coefficient y according to the standard deviation value x. That is, the skew is not taken into account at all in the method of the related art. Thus, if the sign of the T degree τ (i.e., the skew direction of the frequency distribution) is one of the two signs, relatively appropriate correction can be performed. However, if the sign of the T degree τ is the other sign, the difference is further increased by the correction. As a result, appropriate correction is hindered.

In view of the above, the first example of the second embodiment employs the method of switching the correction coefficient to be provided to the standard deviation value σ in accordance with the polarity of the calculated T degree τ, as illustrated in the following FIG. 7.

Specifically, if the polarity of the T degree τ is negative, a value larger than 1.0 (hereinafter referred to as the first coefficient) is selected as the correction coefficient, and if the polarity of the T degree τ is conversely positive, a value smaller than 1.0 (hereinafter referred to as the second coefficient) is selected as the correction coefficient, as indicated by a solid line in FIG. 7. For the sake of confirmation, the correction coefficient provided by the method of the related art is indicated by an alternate long and short dash line in the drawing.

Figure 7:
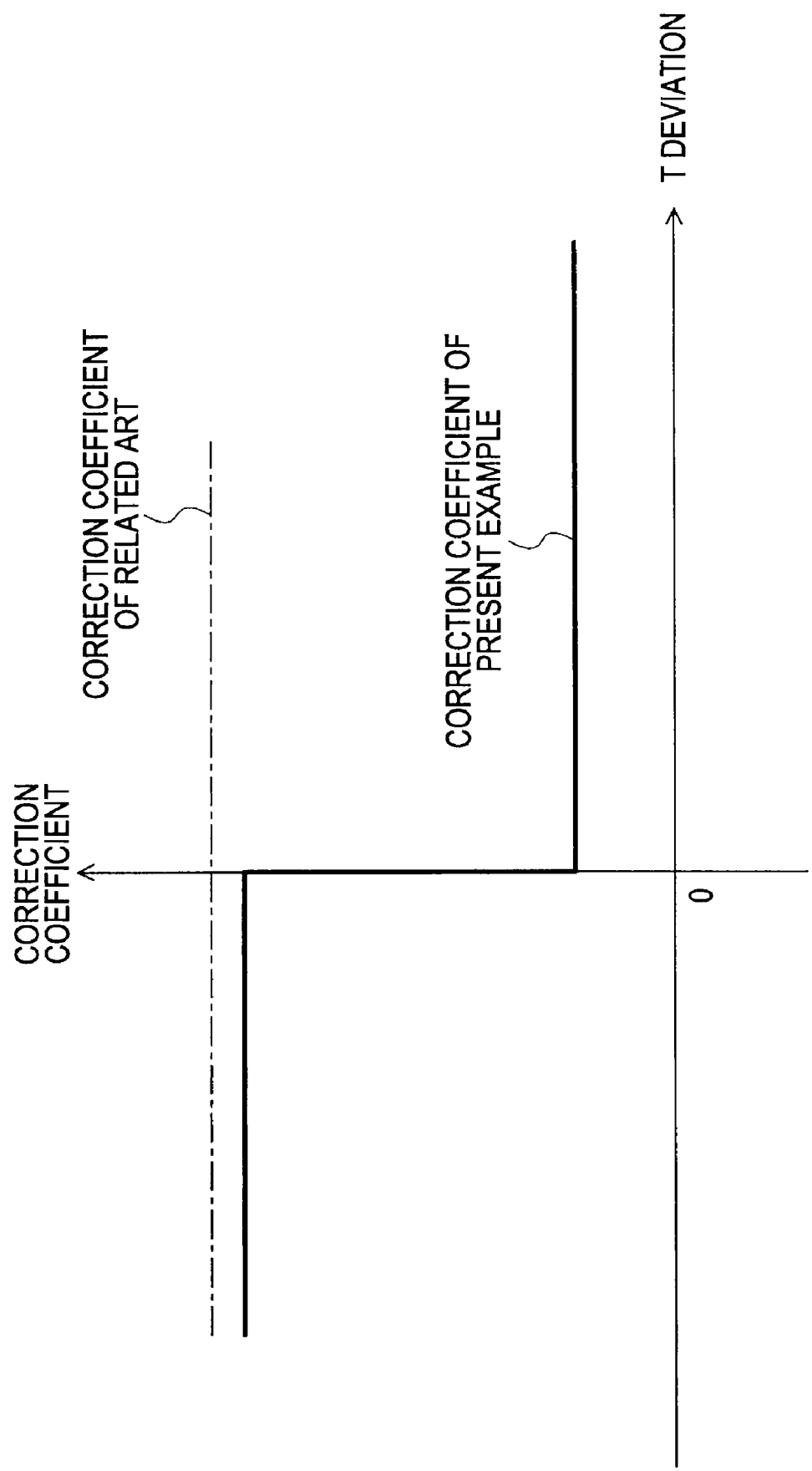
FIG. 7 is a diagram for explaining the operation of a first example of a second embodiment.

With the use of the method illustrated in FIG. 7, if a standard deviation value σ smaller than the standard deviation value σ of the reference machine is expected to be obtained, a correction coefficient larger than 1.0 can be provided. Further, if a standard deviation value σ larger than the standard deviation value σ of the reference machine is expected to be obtained, a correction coefficient smaller than 1.0 can be provided. As a result, it is possible to perform more appropriate correction than the correction according to the method of the related art. That is, it is possible to effectively suppress the evaluation error with respect to the evaluation by the reference machine, and thus to more appropriately perform the evaluation of the optical disc D using the plurality of evaluation apparatuses 1.

Figure 8:
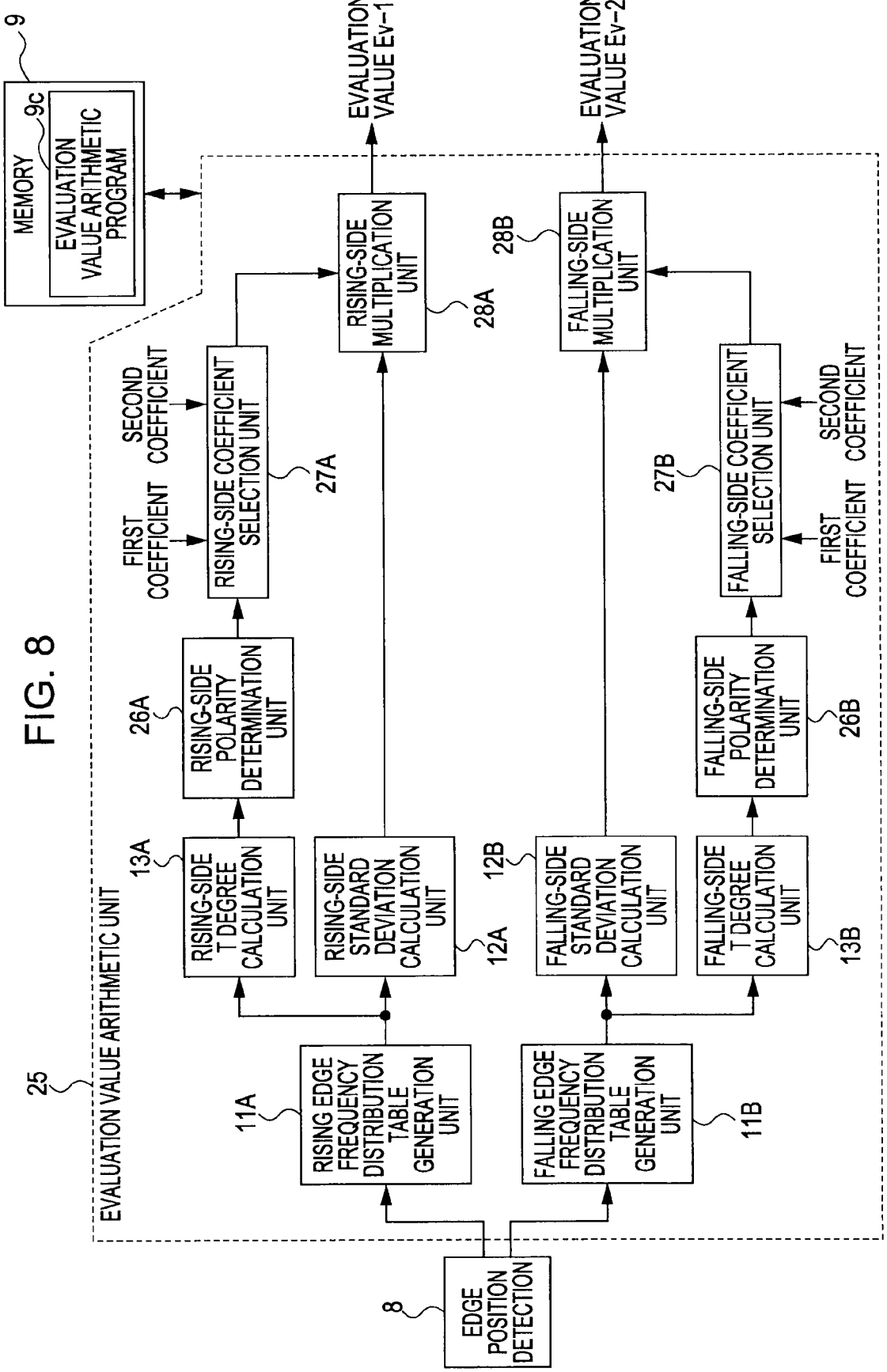
FIG. 8 is a diagram for explaining a configuration for realizing the operation of the first example of the second embodiment.

Configuration for performing correction according to polarity of T degree: FIG. 8 is a diagram for explaining a configuration for performing the correction according to the polarity of the T degree τ described above. Similarly to the foregoing FIG. 2, the drawing illustrates in blocks respective functional operations realized by digital signal processing by an evaluation value arithmetic unit 25 (DSP) included in the evaluation apparatus 1 of the first example of the second embodiment.

In the present case, the memory 9 stores an evaluation value arithmetic program 9c for realizing the correction operation of the present example. Through the digital signal processing based on the evaluation value arithmetic program 9c, the evaluation value arithmetic unit 25 realizes the functional operations illustrated in the respective function blocks of the drawing.

As illustrated in this FIG. 8, in the evaluation value arithmetic unit 25, the configuration for calculating the T degree τ (the average value of τ1 and τ2) and the standard deviation σ (the average value of σ1 and σ2) is similar to the configuration of the evaluation value arithmetic unit 10 illustrated in the foregoing FIG. 2.

In the present case, the configuration for calculating the T deviation (14A, 14B, and 15) is omitted. Instead, function blocks of a rising-side polarity determination unit 26A and a falling-side polarity determination unit 26B are provided to perform polarity determination on the T degrees τ1 and τ2, respectively, which have been calculated by the rising-side T degree calculation unit 13A and the falling-side T degree calculation unit 13B. Further, function blocks of a rising-side coefficient selection unit 27A and a falling-side coefficient selection unit 27B are provided to alternatively select the first coefficient and the second coefficient on the basis of the results of the polarity determination by the rising-side polarity determination unit 26A and the falling-side polarity determination unit 26B. Further, function blocks of a multiplication unit 28A and a multiplication unit 28B are provided to provide the correction coefficient for the rising side and the correction coefficient for the falling side to the standard deviation values σ1 and σ2, respectively, which have been calculated by the rising-side standard deviation calculation unit 12A and the falling-side standard deviation calculation unit 12B.

In FIG. 8, the content of the processing is similar between the rising side and the falling side. Thus, only the operations of the respective units on the rising side will be herein described as a representative. Thus, description of the operations of the respective units on the falling side will be omitted. In the operations on the falling side, the term "rising" in the following description can be replaced by the term "falling".

The rising-side polarity determination unit 26A determines the polarity (the sign) of the T degree value τ1 calculated by the rising-side T degree calculation unit 13A.

Further, on the basis of the result of the determination by the rising-side polarity determination unit 26A, the rising-side coefficient selection unit 27A selects either one of the first coefficient and the second coefficient as the correction coefficient. Specifically, if the result of the determination by the rising-side polarity determination unit 26A indicates the negative polarity, the rising-side coefficient selection unit 27A selects the first coefficient (larger than 1.0). Meanwhile, if the result of the determination indicates the positive polarity, the rising-side coefficient selection unit 27A selects the second coefficient (smaller than 1.0).

The rising-side multiplication unit 28A multiplies the standard deviation value σ1, which has been calculated by the rising-side standard deviation calculation unit 12A, by the correction coefficient, which has been selected by the rising-side coefficient selection unit 27A. Then, the rising-side multiplication unit 28A outputs the result of the multiplication as the evaluation value Ev-1.

Accordingly, it is possible to obtain the evaluation value Ev in which the standard deviation value σ has been appropriately corrected in accordance with the polarity of the T degree τ.

Figure 9:
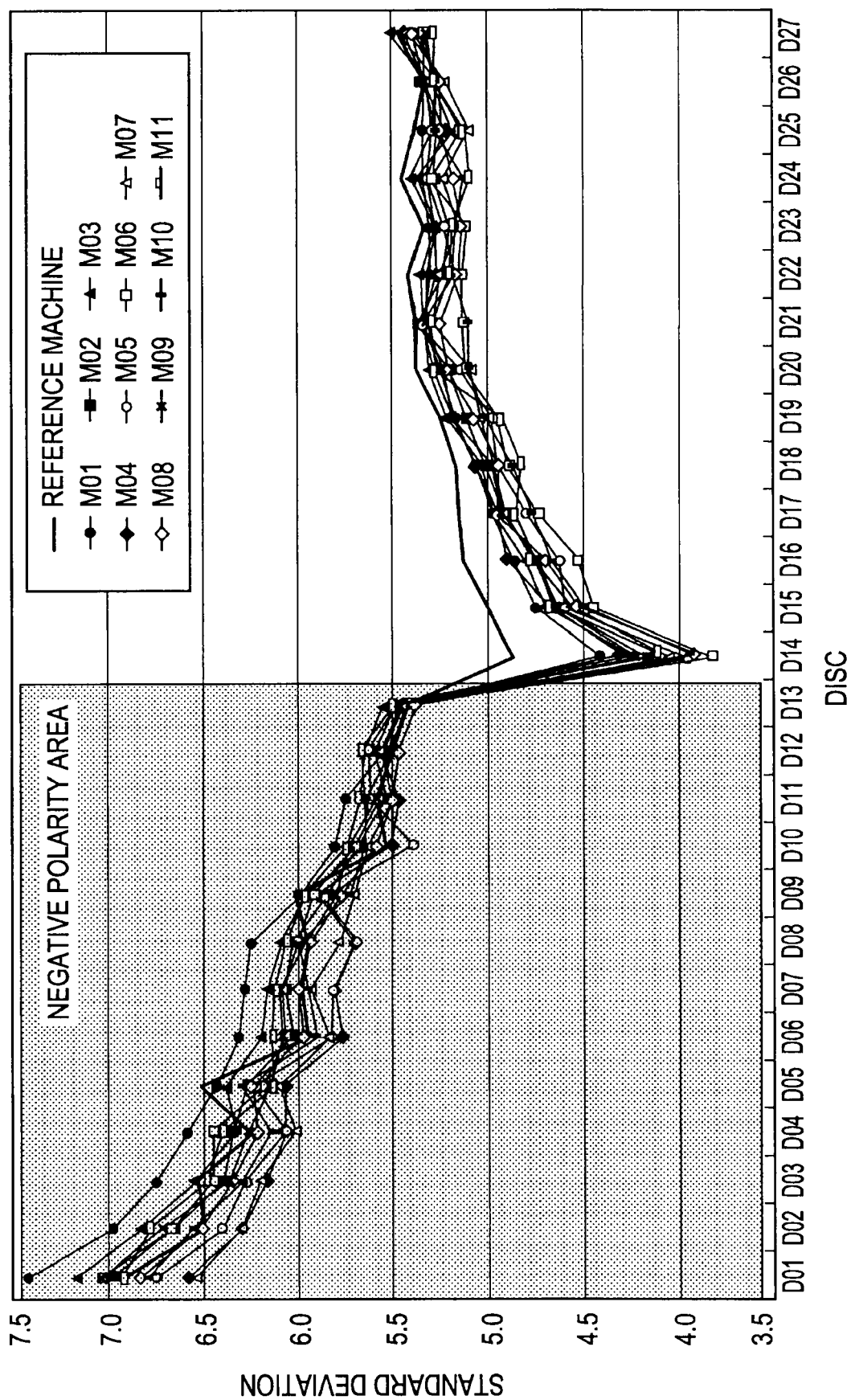
FIG. 9 is a diagram showing correction results obtained by a correction operation of the first example of the second embodiment.

Experiment results: FIG. 9 shows, as the result of correction by the first example of the second embodiment as described above, the result of correction using the polarity of the T degree. This FIG. 9 shows the corrected standard deviation values σ obtained for the same optical discs D (D01 to D27) by the respective measuring machines (fine solid lines in the drawing). It is needless to say that the correction is not performed on the evaluation value of the reference machine (a bold solid line) in the present case.

Further, similarly to the foregoing FIG. 6, the results of the optical discs D for which the T degree τ has the minus sign are grouped together.

As understood from the comparison between the results shown in this FIG. 9 and the results shown in the foregoing FIG. 6, if the correction of the present example is performed, the difference between the evaluation value obtained by the reference machine and the evaluation value obtained by each of the measuring machines can be appropriately corrected.

In the present example, if the polarity of the T degree τ is negative, a value larger than 1.0 is selected as the correction coefficient. Further, if the polarity of the T degree τ is positive, a value smaller than 1.0 is selected as the correction coefficient. However, it is obvious that the inverse coefficients may be selected depending on the selection of the reference machine. Further, it is also obvious that the coefficients to be selected do not necessarily have to have the boundary therebetween at 1.0 and thus may be both equal to or larger than 1.1, such as 1.2 and 1.1, or may be both smaller than 1.1 conversely, depending on the polarity.

Second example: A second example of the second embodiment does not alternatively select one of the two types of correction coefficients, unlike the foregoing first example. Instead, the second example of the second embodiment obtains a function representing the correlation between the T deviation represented as σ×τ and the correction coefficient, and corrects the standard deviation value σ by using the correction coefficient uniquely determined on the basis of the function and the T deviation value.

Particularly, the second example employs a method of calculating the correction coefficient by using, as the above-described function, the linear function expressed as $y=ax+b$, wherein x and y represent the T deviation value and the correction coefficient, respectively.

Herein, the present applicant conducted an experiment to examine the correlation between the T deviation value and the standard deviation value σ. The result of the experiment is shown in the following FIG. 10.

Figure 10:
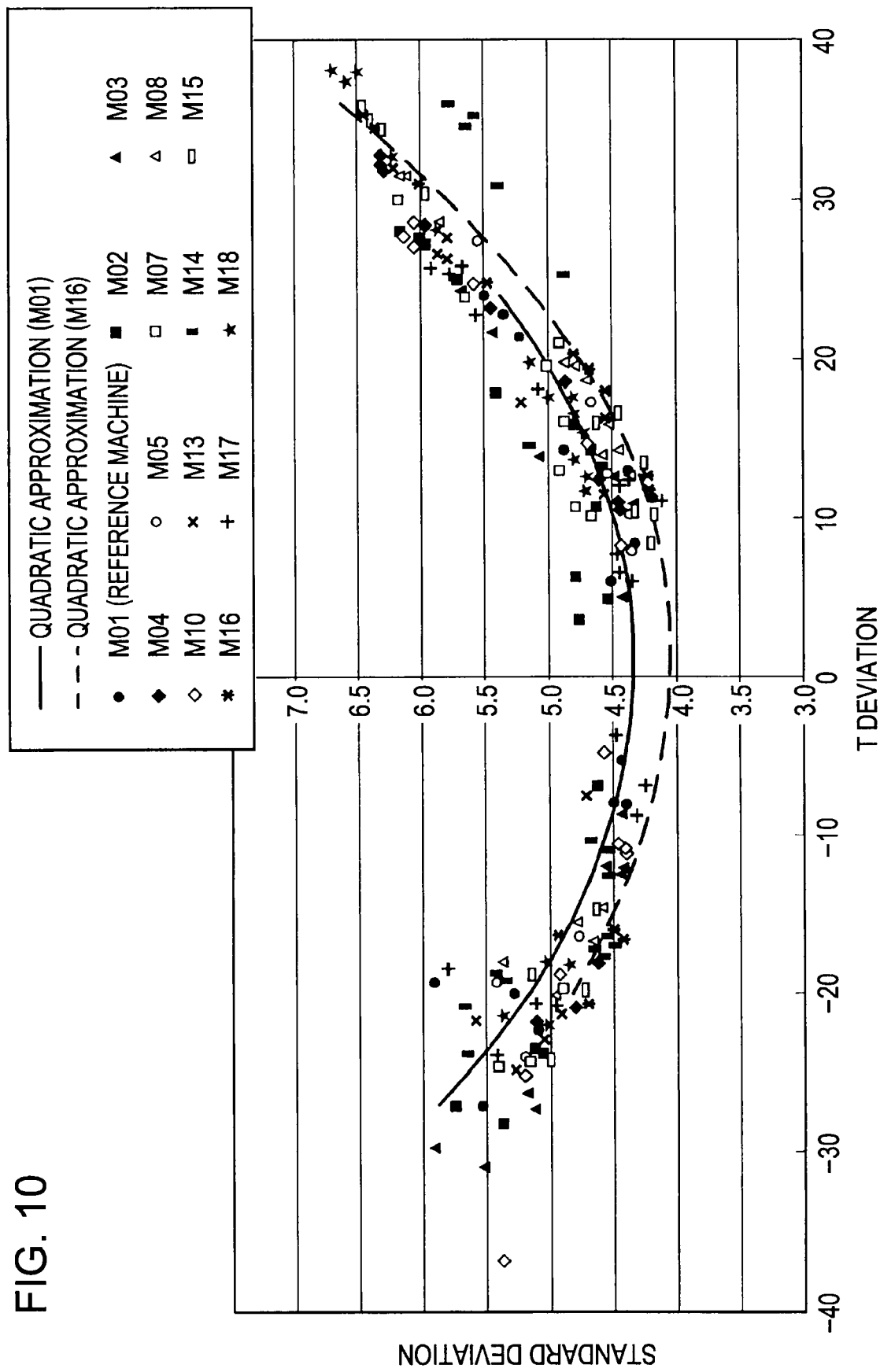
FIG. 10 is a diagram for explaining the correlation between the standard deviation and the T deviation.

In this FIG. 10, the horizontal axis represents the T deviation, and the vertical axis represents the standard deviation σ. The relationship between the T deviation value and the standard deviation value σ calculated for each of the optical discs D is shown for each of the reference machine (M01) and the respective other measuring machines (M02 to M16). The reference machine and the individual measuring machines are identified by different marks of plot points.

The result shown in this FIG. 10 reveals that the standard deviation value σ of each of the measuring machines can be approximated by a quadratic function with respect to the T deviation value. FIG. 10 shows, for example, the result of the quadratic approximation of the reference machine M01 and the result of the quadratic approximation of the measuring machine M16, which are indicated by a solid line and a broken line, respectively.

Further, as understood from the results of the quadratic approximation of the reference machine M01 and the measuring machine M16, it is also found that the quadratic curve obtained by the quadratic approximation varies among the measuring machines.

Herein, as understood from the expression of the T deviation value as $\sigma \times \tau$, the T deviation value has correlativity with the T degree value $\tau$ relating to the skew. At the same time, the T deviation value has correlativity with the standard deviation value $\sigma$.

The T deviation value has correlativity with the standard deviation value $\sigma$, as described above. It is therefore understandable that the correlation between the T deviation value and the standard deviation value $\sigma$ can be expressed by the quadratic approximation for each of the measuring machines, as described above.

Meanwhile, the non-correspondence of the quadratic curves among the measuring machines is considered to be attributed to the difference in the form of skew of the frequency distribution among the measuring machines, which derives from the difference in characteristic among the measuring machines.

However, with reference to the experiment result shown in FIG. 10, the shapes of the respective quadratic curves are generally similar. Therefore, it can be expected from this that the respective quadratic curves have some kind of correlation. Specifically, as for the difference (the ratio) of the value on the vertical axis (the standard deviation $\sigma$) of each of the quadratic curves, it appears that the difference (the ratio) of the standard deviation value $\sigma$ changes in some kind of correlativity with the T deviation value.

In view of the result shown FIG. 10, the present applicant attempted to derive a function representing the correlation between the T deviation value calculated by each of the measuring machines and the value of the ratio between the standard deviation value $\sigma$ calculated by the reference machine and the standard deviation value $\sigma$ calculated by the measuring machine.

Herein, for the sake of confirmation, the value of the ratio between the standard deviation $\sigma$ calculated by the reference machine and the standard deviation $\sigma$ calculated by the measuring machine (the reference machine/the measuring machine) corresponds to the correction coefficient. Therefore, if the above-described ratio between the standard deviation $\sigma$ of the reference machine and the standard deviation $\sigma$ of the measuring machine changes in correlativity with the T deviation value, and if a function which represents the correlation therebetween is obtained, an appropriate correction coefficient can be calculated on the basis of the function and the T deviation value.

Figure 11:
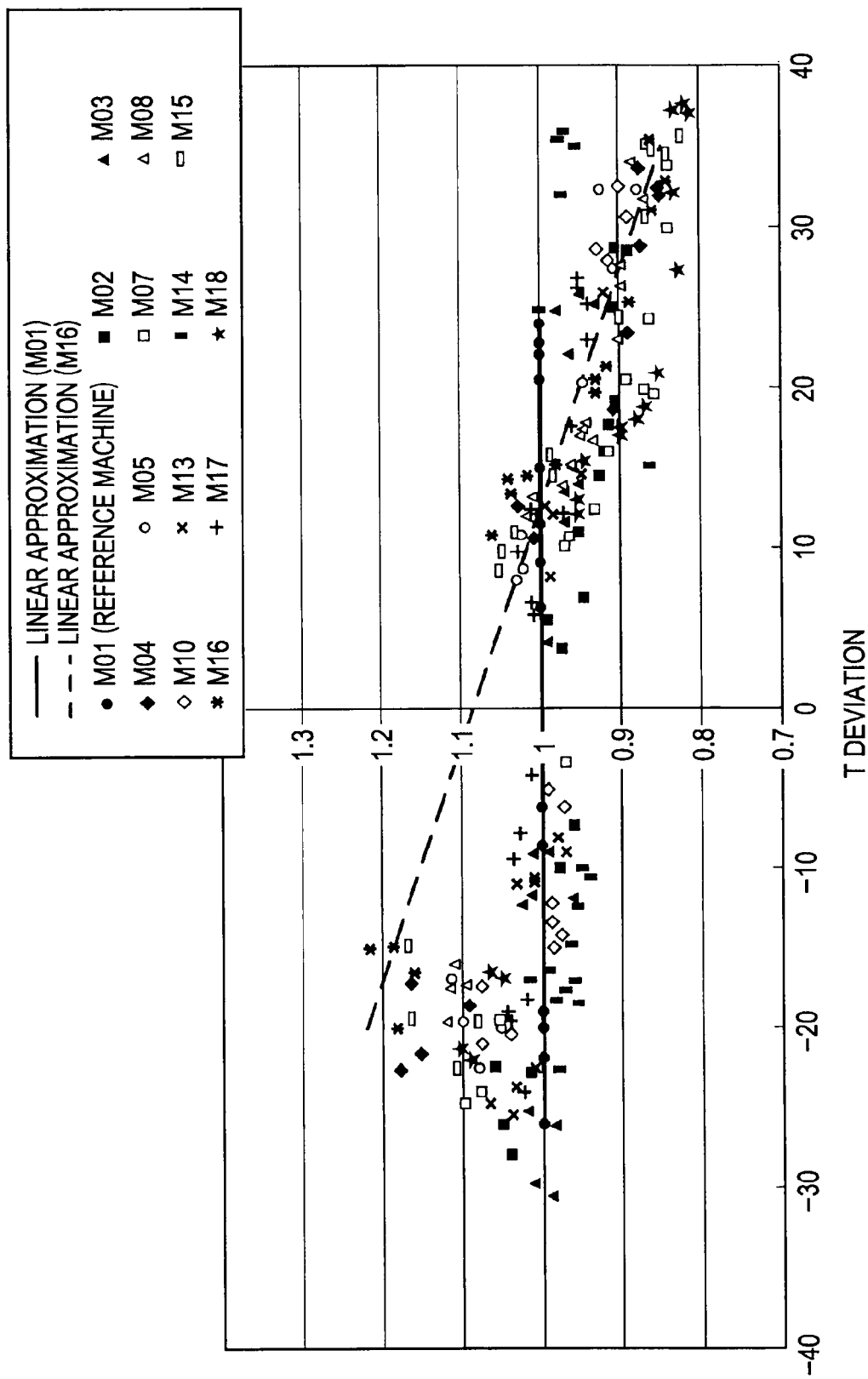
FIG. 11 is a diagram for explaining the correlation between the value of the T deviation and the value of the ratio between the standard deviation calculated by the reference machine and the standard deviation calculated by each of the measuring machines.

FIG. 11 shows, as the result of an experiment performed to derive the above-described function representing the correlation between the T deviation value and the ratio between the standard deviations (the standard deviation ratio), the result of calculation of the ratio between the standard deviation value $\sigma$ of the reference machine and the standard deviation value $\sigma$ of each of the measuring machines (the reference machine M01/the measuring machine) calculated for each of the T deviation values of the measuring machine.

Also in this FIG. 11, the reference machine and the individual measuring machines are identified by different marks of plot points. It is needless to say that the result of the reference machine is constant at the value of one in this case (a solid line in the drawing).

As indicated by a broken line in this FIG. 11, it is found that the value of the standard deviation ratio between the respective standard deviations of the reference machine and the measuring machine (i.e., the correction coefficient) can be approximated by a linear function with respect to the T deviation value of the measuring machine. That is, it is understood from this that the correction coefficient can be calculated from the linear function represented as $y=ax+b$, wherein x and y represent the T deviation value of the measuring machine and the correction coefficient, respectively.

Figure 12:
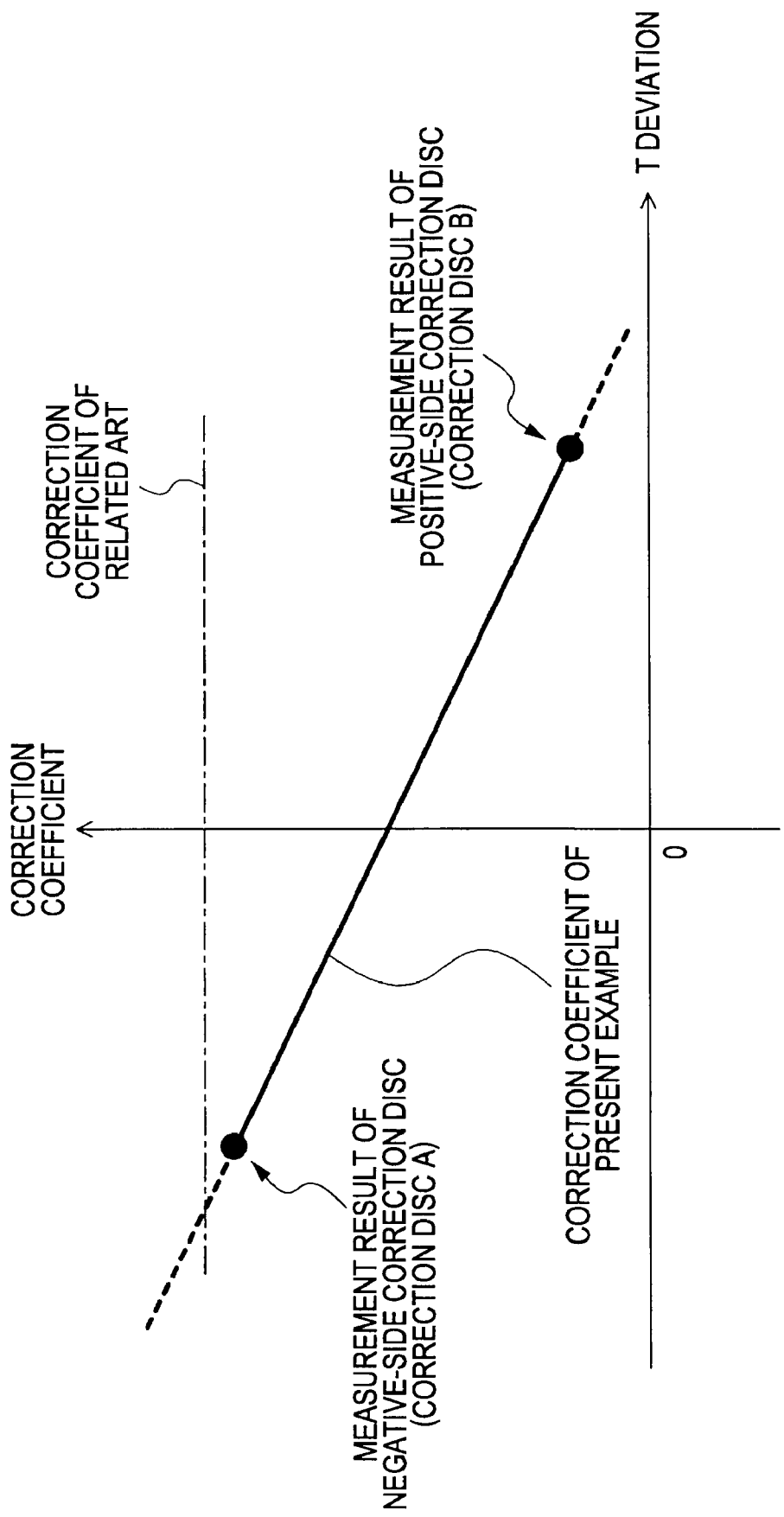
FIG. 12 is a diagram for explaining the operation of a second example of the second embodiment.

FIG. 12 is a diagram for explaining a correction operation of the second example of the second embodiment for calculating the correction coefficient by using the linear function as described above. In this drawing, the horizontal axis (x) represents the T deviation, and the vertical axis (y) represents the correction coefficient (the standard deviation ratio). For comparison, this FIG. 12 also shows the correction coefficient of the related art indicated by an alternate long and short dash line.

To obtain the above-described linear function, the measurement values of at least two points are first necessary as the actual measurement values. That is, to obtain the slope value a (the gain a) and the offset b of the above-described linear function, the measurement values of two points forming two coordinate points are necessary.

Herein, in the above-described linear function, the value of y represents the standard deviation ratio between the respective standard deviations of the reference machine and the measuring machine. Therefore, to obtain the two coordinate points, it is necessary that each of the reference machine and the measuring machine previously calculates the standard deviation value $\sigma$ of each of two optical discs D (hereinafter referred to as D-A and D-B, respectively) which have different T deviation values.

In this case, optical discs D each having a large skew in the frequency distribution of the edge positions are previously selected as the optical discs D-A and D-B. Specifically, an optical disc D having a T deviation value increased in the negative direction is previously selected as one of the optical discs D-A, and an optical disc D having a T deviation value increased conversely in the positive direction is previously selected as the other one of the optical discs D-B.

The optical discs D-A and D-B are used to derive the function for performing the correction, and thus will be hereinafter referred to as the correction discs. The optical disc D-A will be referred to as the negative-side correction disc (or simply as the correction disc A), while the optical disc D-B will be referred to as the positive-side correction disc (the correction disc B).

The reference machine calculates the standard deviation value $\sigma$ of each of the correction discs A and B. The standard deviation $\sigma$ of the correction disc A and the standard deviation $\sigma$ of the correction disc B thus calculated by the reference machine will be referred to as the standard deviation $\sigma$-Ar and the standard deviation $\sigma$-Br, respectively.

Meanwhile, each of the measuring machines first calculates the standard deviation value $\sigma$ of each of the same correction discs A and B (hereinafter referred to as $\sigma$-As and $\sigma$-Bs).

Further, each of the measuring machines also calculates the T deviation value of each of the correction discs A and B. The T deviation calculated for the correction disc A and the T deviation calculated for the correction disc B will be referred to as the T deviation T-As and the T deviation T-Bs, respectively.

Then, with the use of the standard deviation σ-Ar calculated as described above for the correction disc A by the reference machine and the standard deviation σ-As calculated as described above, the value of the standard deviation σ-Ar divided by the standard deviation σ-As is calculated. Thereby, the standard deviation ratio for the T deviation T-As (σ-Ar/σ-As) is obtained. That is, the coordinates of the first point defined by the x-coordinate of T-As and the y-coordinate of σ-Ar/σ-As are obtained.

Similarly, with the use of the standard deviation σ-Br calculated for the correction disc B by the reference machine and the standard deviation σ-Bs calculated for the correction disc B, the value of the standard deviation σ-Br divided by the standard deviation σ-Bs is calculated. Thereby, the coordinates of the second point defined by the x-coordinate of T-Bs and the y-coordinate of σ-Br/σ-Bs are obtained.

With the two coordinate points thus obtained, an equation representing a straight line passing through the two coordinate points (a linear function) is obtained. That is, simultaneous equations of σ-Ar/σ-As=a×T-As+b and σ-Br/σ-Bs=a×T-Bs+b are solved to obtain the gain a and the offset b of the equation y=ax+b.

From the above-described calculation, the linear function representing the correlation between the T deviation and the correction coefficient is obtained for each of the measuring machines. Then, each of the measuring machines calculates the evaluation value Ev of the optical disc D, which is the actual evaluation target.

Specifically, the standard deviation value σ is first calculated. Further, the T deviation value is calculated and substituted for the value of x in the linear function, and the linear function is solved to obtain the correction coefficient, which is the value of y. Then, the standard deviation value σ is multiplied by the obtained correction coefficient to calculate the ultimate evaluation value Ev.

According to the above-described correction operation of the second example of the second embodiment, the correction coefficient can be more finely selected in accordance with the T deviation value (the skew direction and the skew degree of the frequency distribution) than in a case in which the correction coefficient is switched between two types, as in the correction operation of the foregoing first example. In this regard, more appropriate correction can be performed.

Further, the linear function is obtained for each of the measuring machines. Therefore, an appropriate linear function representing the relationship with the reference machine can be obtained for each of the measuring machines. As a result, the correction can be more appropriately performed.

Figure 13:
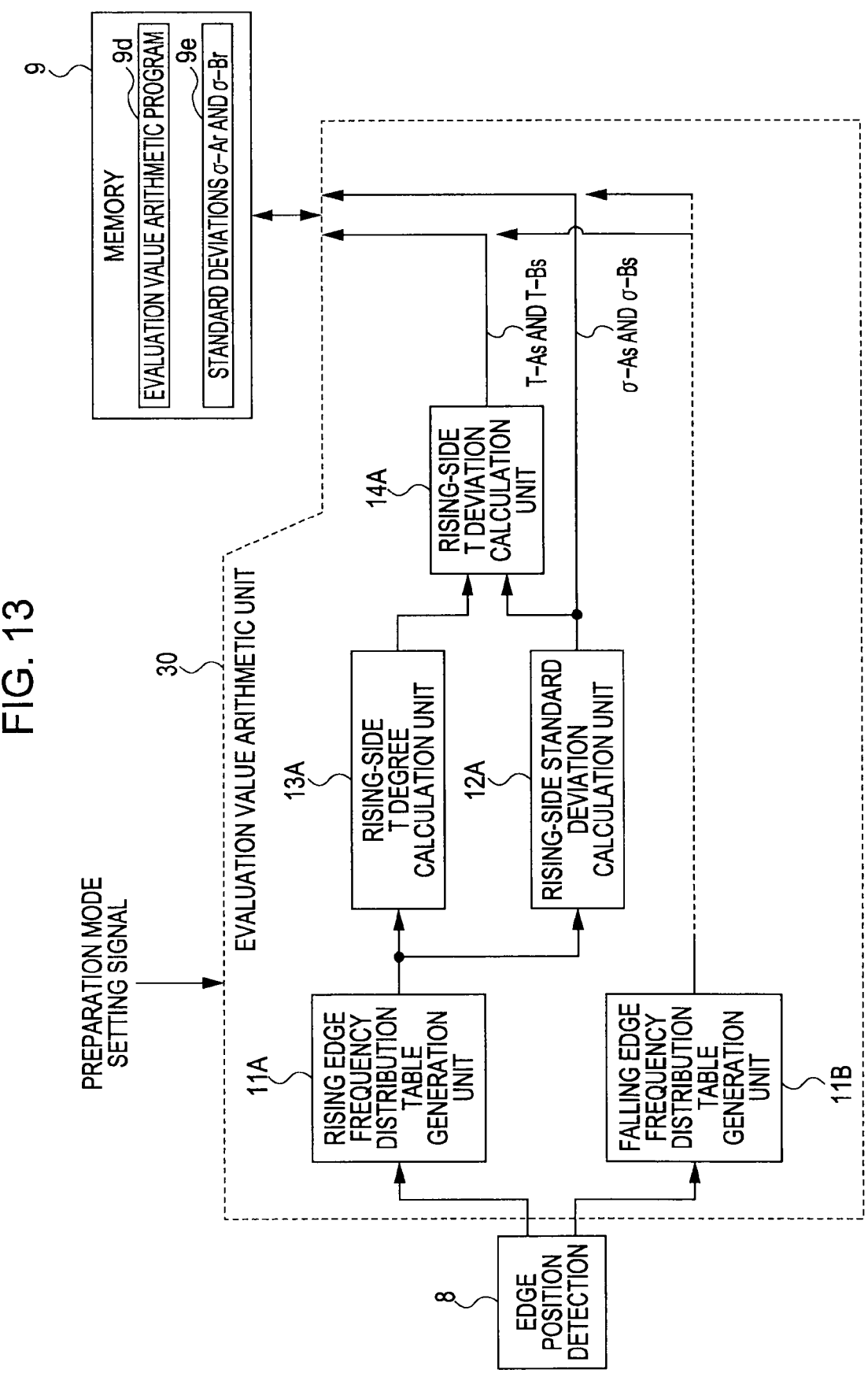
FIG. 13 is a diagram for explaining a configuration for realizing an operation to be performed in response to a preparation mode as the operation of the second example of the second embodiment.
Figure 14:
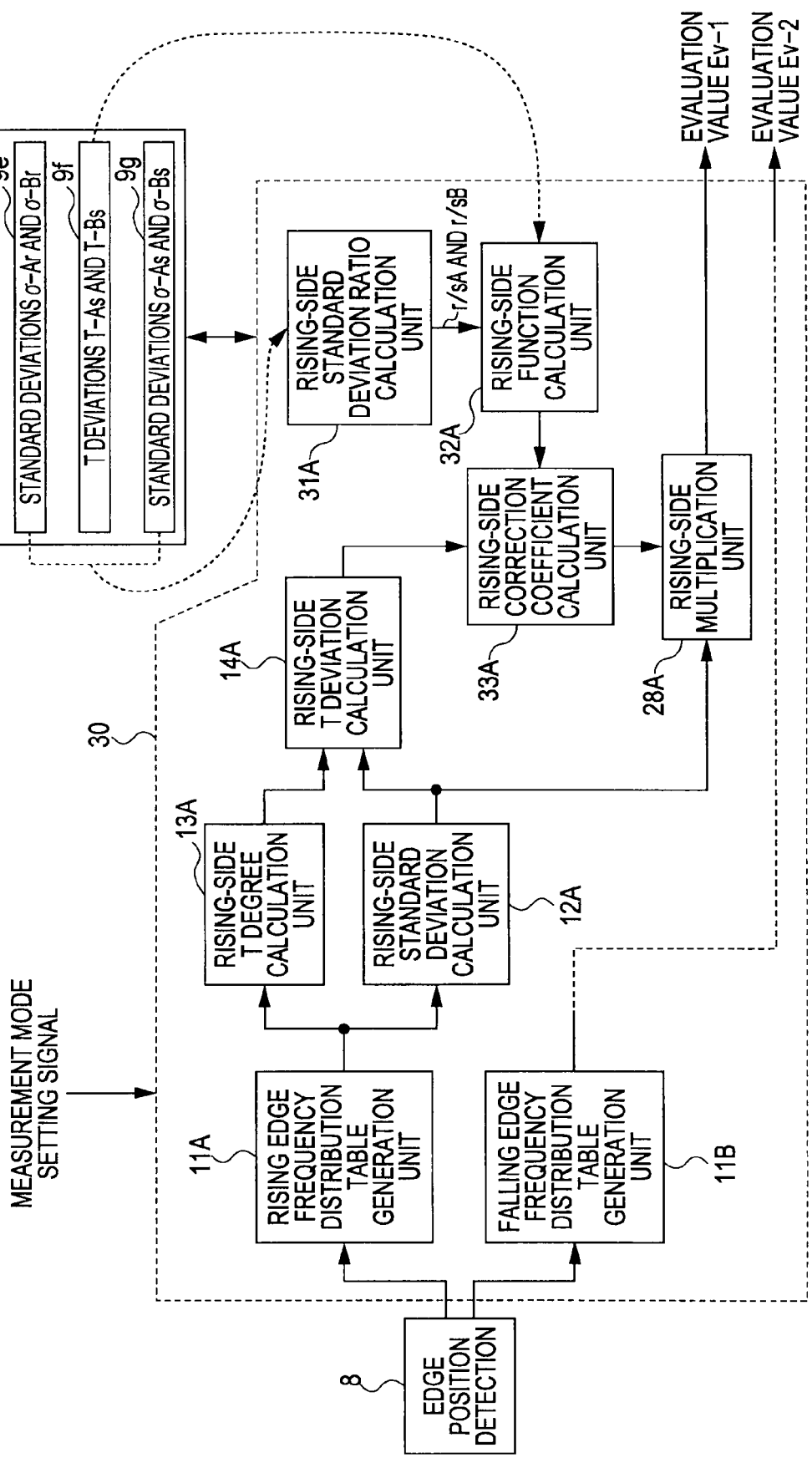
FIG. 14 is a diagram for explaining a configuration for realizing an operation to be performed in response to a measurement mode as the operation of the second example of the second embodiment.

Configuration for performing correction using linear function: FIGS. 13 and 14 are diagrams for explaining a configuration for realizing the correction operation of the second example described above. Similarly to the foregoing FIG. 2, the drawings illustrate in blocks respective functional operations realized by digital signal processing by an evaluation value arithmetic unit 30 (DSP) included in the evaluation apparatus 1 of the second example of the second embodiment.

In the present case, the memory 9 stores an evaluation value arithmetic program 9d for realizing the correction operation of the present example. Through the digital signal processing based on the evaluation value arithmetic program 9d, the evaluation value arithmetic unit 30 realizes the respective functional operations illustrated in the function blocks of each of the drawings.

As understood from the foregoing description, it is necessary in the second example to first perform the processing for obtaining the linear function prior to the calculation of the evaluation value Ev of the optical disc D, which is the actual evaluation target. Specifically, to obtain the linear function in the present case, it is necessary that each of the measuring machines previously calculates at least the standard deviation values σ-As and σ-Bs and the T deviation values T-As and T-Bs of the correction discs A and B.

It is understood from this that, to calculate the standard deviations σ-As and σ-Bs and the T deviations T-As and T-Bs, the evaluation apparatus 1 of the present case is necessary to be configured to be switchable between an operation mode for calculating only the standard deviation σ and the T deviation of the installed optical disc D and an operation mode for calculating the evaluation value Ev of the installed optical disc D.

The evaluation apparatus 1 of the present example is configured to instruct the evaluation value arithmetic unit 30 to switch between the modes in accordance with a preparation mode setting signal and a measurement mode setting signal illustrated in FIGS. 13 and 14, respectively. Although illustration is omitted, the mode setting signals are supplied by a controller which performs overall control of the evaluation apparatus 1.

Herein, in the preparation mode of the present case, an operation of calculating the standard deviations σ-As and σ-Bs and the T deviations T-As and T-Bs and storing the calculated values in the memory 9 is assumed to be performed, for example.

Meanwhile, in the measurement mode, the following operations are assumed to be performed, i.e., an operation of calculating the linear function on the basis of the standard deviations σ-Ar and σ-Br calculated by the reference machine and previously stored in the memory 9 and the standard deviation values σ-As and σ-Bs and the T deviation values T-As and T-Bs stored as described above, and an operation of calculating the standard deviation σ and the T deviation of the installed optical disc D and calculating the evaluation value Ev on the basis of the thus calculated values and the above-described linear function.

For the sake of confirmation, in the present case, the standard deviation values σ-Ar and σ-Br calculated for the respective correction discs A and B by the evaluation apparatus 1 serving as the reference machine are input to the evaluation apparatus 1 serving as each of the measuring machines, and the input values are stored in the memory 9 (the reference numeral 9e in the drawings). Herein, description will be made of, for example, a case in which the standard deviations σ-As and σ-Bs and the T deviations T-As and T-Bs are calculated in the preparation mode after the storage of the values 9e calculated for the correction discs A and B by the reference machine as described above. However, it is also possible, of course, to input and store the values 9e obtained from the reference machine after the calculation of the standard deviations σ-As and σ-Bs and the T deviations T-As and T-Bs.

Further, also in the present case, the evaluation value Ev is calculated separately for the rising side (Ev-1) and the falling side (Ev-2).

For the convenience of illustration, FIGS. 13 and 14 only illustrate the function blocks for calculating the rising-side evaluation value Ev-1. In fact, functional operations similar to the functional operations by the respective function blocks on the rising side illustrated in the respective drawings are performed also on the falling side. Also in the present case, the functional operations on the falling side are similar to the functional operations on the rising side, which will be described below, and thus description thereof will be omitted.

Further, for the calculation of the falling-side evaluation value Ev-2, the memory 9 also stores the standard deviation values σ-Ar and σ-Br calculated for the falling edge positions of the correction discs A and B by the reference machine. The present example illustrates the storage of only the standard deviation values σ-Ar and σ-Br (9e in the drawings) calculated for the rising edge positions of the correction discs A and B by the reference machine. In fact, however, the standard deviation values σ-Ar and σ-Br calculated as described above for the falling edge positions are also stored. Then, with the use of the standard deviation values σ-Ar and σ-Br calculated for the falling edge positions, the function for calculating the falling-side evaluation value Ev-2 is calculated.

With reference to FIG. 13, the functional operations performed in response to the preparation mode will be first described.

Among the functional operations represented by the function blocks illustrated in the foregoing FIG. 2, only necessary functional operations up to the calculation of the T deviation are performed as the functional operations to be performed in the preparation mode. Specifically, the functional operations of the rising edge frequency distribution table generation unit 11A, the rising-side standard deviation calculation unit 12A, the rising-side T degree calculation unit 13A, and the rising-side T deviation calculation unit 14A are performed.

In the preparation mode, the respective functional operations described above are performed to calculate the standard deviation value σ and the T deviation value for each of the correction discs A and B.

In the present case, the rising-side standard deviation calculation unit 12A stores in the memory 9 the standard deviation value σ calculated for the correction disc A (e.g., the standard deviation value σ calculated for the first optical disc D installed after the setting of the preparation mode) as the standard deviation σ-As.

Further, the rising-side standard deviation calculation unit 12A stores in the memory 9 the standard deviation value σ calculated for the correction disc B (e.g., the standard deviation value σ calculated for the second optical disc D installed after the setting of the preparation mode) as the standard deviation σ-Bs.

Further, in the present case, the rising-side T deviation calculation unit 14A stores in the memory 9 the T deviation value calculated for the correction disc A (e.g., the T deviation value calculated for the first optical disc D installed after the setting of the preparation mode) as the T deviation T-As.

Further, the rising-side T deviation calculation unit 14A stores in the memory 9 the T deviation value calculated for the correction disc B (e.g., the T deviation value calculated for the second optical disc D installed after the setting of the preparation mode) as the T deviation T-Bs.

For the sake of confirmation, also on the falling side, functional operations similar to the respective functional operations as described above are in fact performed, and the standard deviations σ-As and σ-Bs and the T deviations T-As and T-Bs of the falling edge positions are stored in the memory 9.

Subsequently, with reference to FIG. 14, description will be made of the functional operations performed in response to the measurement mode. In the initial state of the measurement mode, the standard deviation values σ-As and σ-Bs (the reference numeral 9g in the drawing) and the T deviation values T-As and T-Bs (the reference numeral 9f in the drawing) have been stored in the memory 9 due to the operations performed in the preceding preparation mode.

In FIG. 14, among the functional operations of the respective function blocks illustrated in FIG. 2, the necessary functional operations up to the calculation of the T deviation (corresponding to the units from the rising edge frequency distribution table generation unit 11A to the rising-side T deviation calculation unit 14A) are performed as the functional operations to be performed in the measurement mode. Then, the following functional operations are performed, i.e., the functional operations of a rising-side standard deviation ratio calculation unit 31A which calculates the standard deviation ratio between the respective standard deviations of the reference machine and the present evaluation apparatus 1 (the present measuring machine), a rising-side function calculation unit 32A which obtains the linear function by calculation, a rising-side correction coefficient calculation unit 33A which performs the calculation of the correction coefficient based on the T deviation and the linear function, and the rising-side multiplication unit 28A.

On the basis of the standard deviations σ-Ar and σ-Br (9e) calculated by the reference machine and stored in the memory 9 and the standard deviations σ-As and σ-Bs (9g) calculated by the present evaluation apparatus 1 in the preceding preparation mode, the rising-side standard deviation ratio calculation unit 31A calculates the values of two standard deviation ratios represented as σ-Ar/σ-As and σ-Br/σ-Bs (represented as r/sA and r/sB in the drawing).

On the basis of the standard deviation ratios σ-Ar/σ-As and σ-Br/σ-Bs calculated by the rising-side standard deviation ratio calculation unit 31A and the T deviations T-As and T-Bs stored in the memory 9, the rising-side function calculation unit 32A calculates the linear function (the gain a and the offset b) representing the correlation between the T deviation and the standard deviation ratio between the respective standard deviations of the reference machine and the present evaluation apparatus 1 (the correction coefficient). That is, the rising-side function calculation unit 32A calculates the gain a and the offset b by solving the previously described simultaneous equations σ-Ar/σ-As=a×T-As+b and σ-Br/σ-Bs=a×T-Bs+b.

On the basis of the T deviation value calculated by the rising-side T deviation calculation unit 14A and the values of the gain a and the offset b calculated by the rising-side function calculation unit 32A, the rising-side correction coefficient calculation unit 33A calculates the correction coefficient. That is, the rising-side correction coefficient calculation unit 33A substitutes the T deviation value for the value of x in the linear function y=ax+b to obtain by calculation the correction coefficient, which is the value of y.

The rising-side multiplication unit 28A multiplies the standard deviation value σ, which has been calculated by the rising-side standard deviation calculation unit 12A, by the correction coefficient value, which has been calculated by the rising-side correction coefficient calculation unit 33A. Then, the rising-side multiplication unit 28A outputs the result of the multiplication as the evaluation value Ev-1.

For the sake of confirmation, in the present case, a falling-side standard deviation ratio calculation unit (31B), the illustration of which is omitted, calculates the values of the standard deviation ratios σ-Ar/σ-As and σ-Br/σ-Bs for the falling side on the basis of the standard deviations σ-Ar and σ-Br of the falling edge positions stored in the memory 9 and the standard deviation values σ-As and σ-Bs of the falling edge positions calculated by the present evaluation apparatus 1 in the preceding preparation mode. Further, on the basis of the standard deviation ratios σ-Ar/σ-As and σ-Br/σ-Bs calculated by the falling-side standard deviation ratio calculation unit (31B) and the T deviations T-As and T-Bs of the falling edge positions stored in the memory 9, a falling-side function calculation unit (32B) calculates the linear function representing the correlation between the T deviation and the standard deviation ratio between the respective standard deviations of the reference machine and the present evaluation apparatus 1 (the correction coefficient) of the falling edge positions. Further, a falling-side correction coefficient calculation unit (33B) calculates the correction coefficient for the falling side by using the T deviation calculated by the falling-side T deviation calculation unit 14B and the liner function calculated for the falling side. The falling-side multiplication unit (28B) multiplies the thus calculated correction coefficient by the standard deviation value σ calculated by the falling-side standard deviation calculation unit 12B. Thereby, the falling-side evaluation value Ev-2 shown in the drawing is obtained.

Third Example

Herein, the second embodiment calculates the correction coefficient by using, as the reference, the T deviation value calculated for the optical disc D. The absolute value of the T deviation value represents the skew amount of the frequency distribution. According to the description of the foregoing first embodiment, however, the third root is used in the calculation of the T deviation. Therefore, the T deviation value does not linearly respond to the actual skew amount. Specifically, the T deviation value tends to be substantially changed in an area in which the skew of the frequency distribution is close to zero, as compared with an area in which the skew amount is large.

According to the above, if the correction coefficient is calculated on the basis of the linear characteristic of a linear function, as in the correction operation of the foregoing second example, a coefficient larger than the correction coefficient which should be originally provided may be provided particularly to a favorable optical disc D having a skew amount close to zero. As a result, there arises concern that the variation between appropriate correction and inappropriate correction may be generated in the optical disc D having a small skew.

To improve the above-described situation, therefore, a dead zone is provided to fix the slope to zero in an area in which the T deviation is close to zero, as illustrated in the following FIG. 15.

Herein, in consideration of the tendency of the T deviation value to be substantially changed in the area in which the actual skew of the frequency distribution is close to zero, as described above, the change in the actual skew amount of the frequency distribution is considered to be substantially absent in the area in which the T deviation is close to zero. On the basis of the assumption that the actual skew amount remains substantially the same in the area in which the T deviation is close to zero, as described above, a third example sets the slope to the constant value of zero in the area in which the T deviation is close to zero, to thereby obtain a more appropriate correction coefficient according to the actual skew amount.

Figure 15:
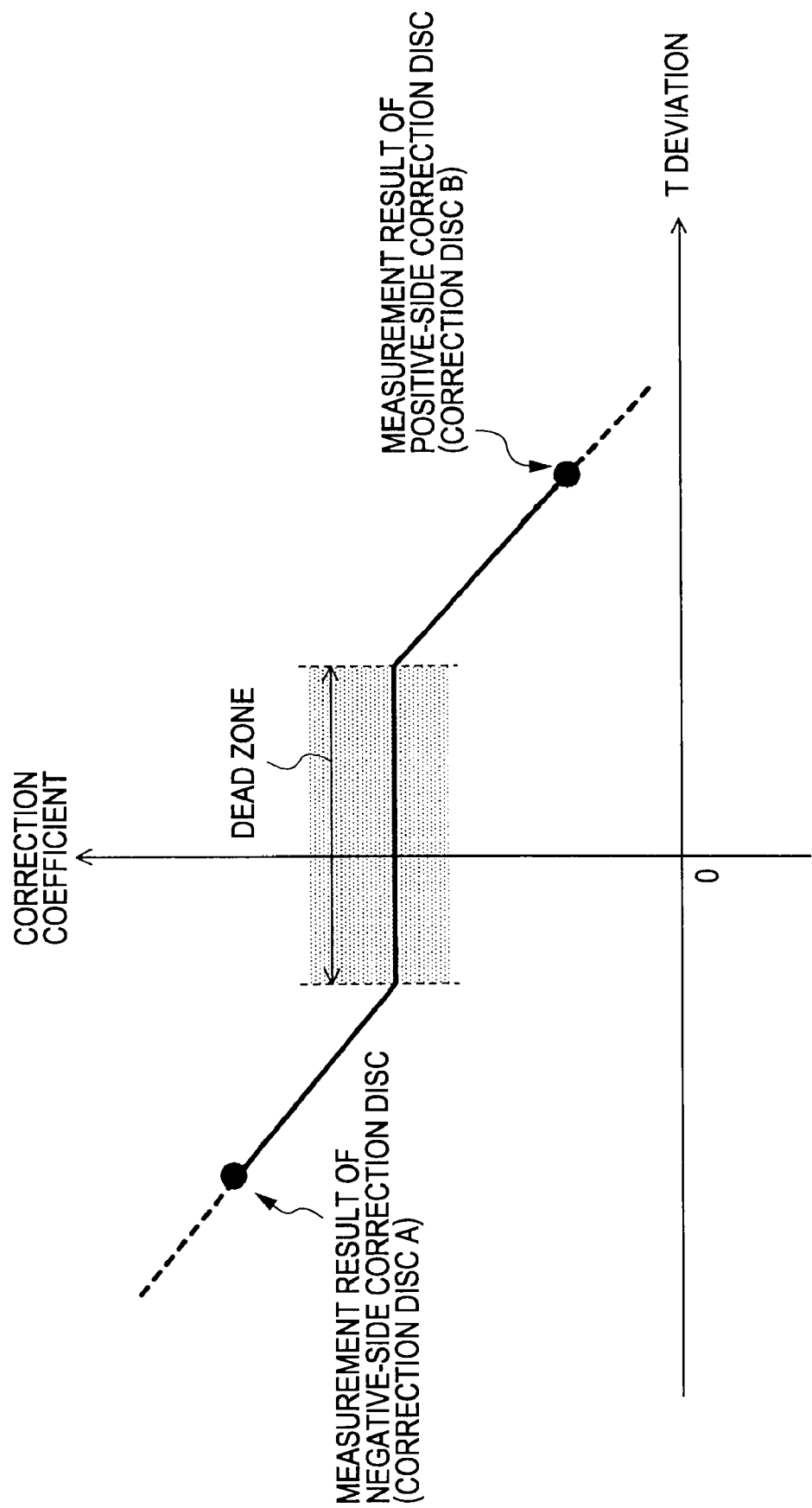
FIG. 15 is a diagram illustrating an example of a function obtained by the operation of a third example of the second embodiment.

For the sake of confirmation, if the value on the horizontal axis in FIG. 15 is replaced by the actual skew amount, the width of the dead zone is much narrower than the width shown in FIG. 15. In such a case, the function representing the correlation between the actual skew amount and the correction coefficient can be regarded as a linear function substantially lacking the dead zone. That is, in terms of the relationship between the actual skew amount and the correction coefficient, the function illustrated in the drawing still corresponds to the linear function. In other words, similarly to the foregoing second example, the third example is also based on the assumption that the relationship between the skew amount and the correction coefficient can be approximated by the liner function.

Figure 16:
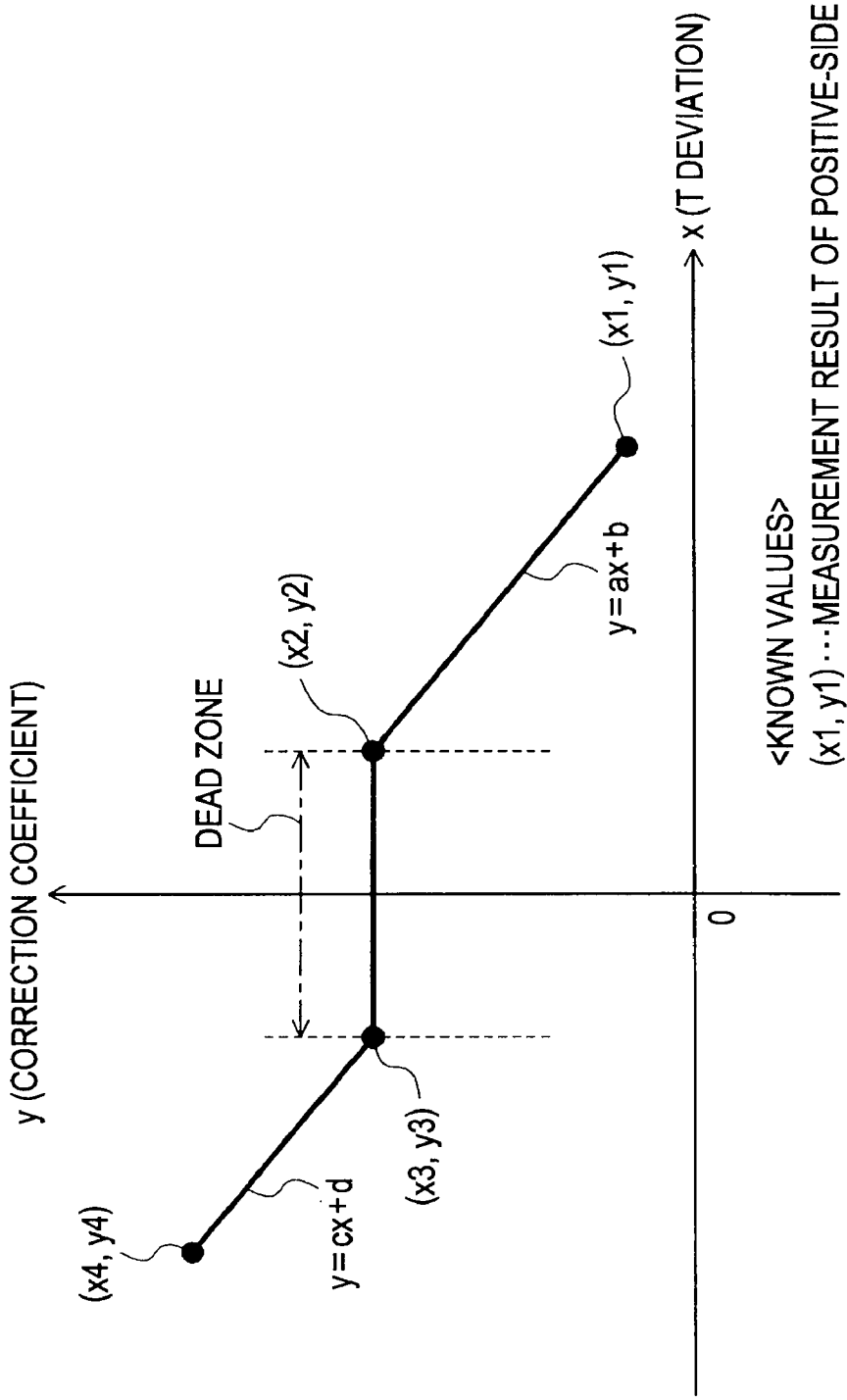
FIG. 16 is a diagram for explaining an operation to be performed to obtain the function illustrated in FIG. 15.

FIG. 16 is a diagram for explaining an operation to be performed to obtain the function illustrated in FIG. 15. The drawing also illustrates the function representing the correlation between the T deviation and the correction coefficient, with the horizontal axis (x) and the vertical axis (y) representing the T deviation and the correction coefficient, respectively.

Firstly, in the third example, the information of the range of the T deviation for defining the dead zone is previously set. That is, the information of the range of the T deviation, which is defined by x2 and x3 in the drawing, is set.

Also in the present case, the actual measurement values of two points are necessary to obtain the function. Specifically, the following values are necessary, i.e., the T deviation (T-As) and the standard deviation ratio (σ-Ar/σ-As) of the correction disc A represented by coordinates (x4, y4) in the drawing, and the T deviation (T-Bs) and the standard deviation ratio (σ-Br/σ-Bs) of the correction disc B represented by coordinates (x1, y1).

As understood from the description of the foregoing second example, the values of the T deviation T-As, the standard deviation ratio σ-Ar/σ-As, the T deviation T-Bs, and the standard deviation ratio σ-Br/σ-Bs are previously calculated by the reference machine and each of the measuring machines, and thus are known values in the calculation of the function. That is, the coordinates (x4, y4) and (x1, y1) are known values. Further, the values of x2 and x3 for setting the dead zone are also known.

Herein, as described above, the third example is also based on the assumption that the relationship between the skew amount and the correction coefficient can be approximated by the linear function, as in the foregoing second example. Therefore, there is a condition that two linear expressions y=ax+b and y=cx+d, which are divided by the dead zone in the drawing, have the equal slopes a and c. Further, the slope is made constant at zero in the dead zone. Therefore, there is another condition of y2=y3.

With the provision of the two conditions and the known values described above, the values of a, b, c, and d in the two linear expressions y=ax+b and y=cx+d can be calculated. Firstly, the slope a of the straight line y=ax+b connecting the coordinates (x1, y1) and (x2, y2) can be represented as a=(y1−y2)/(x1−x2). Further, the slope c of the straight line y=cx+d connecting the coordinates (x3, y3) and (x4, y4) can be represented as c=(y3−y4)/(x3−x4).

Herein, on the basis of the conditions a=c and y2=y3 (=yr), an equation yr=[y1(x3−x4)+y4(x1−x2)]/[(x3−x4)+(x1−x2)] is established. That is, the values of y2 and y3 are calculated from the equation.

With the use of the thus calculated value y2=y3=yr, the values of a, b, c, and d are calculated. That is, the following calculations are performed, i.e., a=(y1−yr)/(x1−x2), b=(yr×x1−y1×x2)/(x1−x2), c=(yr−y4)/(x3−x4), and d=(y4×x3−yr×x4)/(x3−x4).

In the present case, the calculation of the correction coefficient using the function is performed on the basis of the two linear functions obtained by the above-described calculations and the classification conditions relating to the T deviation value. That is, the correction coefficient is calculated as follows, i.e., y=ax+b when x>x2, y=yr when x3≦x≦x2, and y=cx+d when x<x3.

According to the above-described correction operation of the third example, the correction coefficient provided in the area in which the T deviation is close to zero can be set to a constant value. Therefore, it is possible to effectively prevent a favorable optical disc D having a small skew amount from being provided with a coefficient larger than the correction coefficient which should be originally provided. As a result, more favorable correction can be performed.

Figure 17:
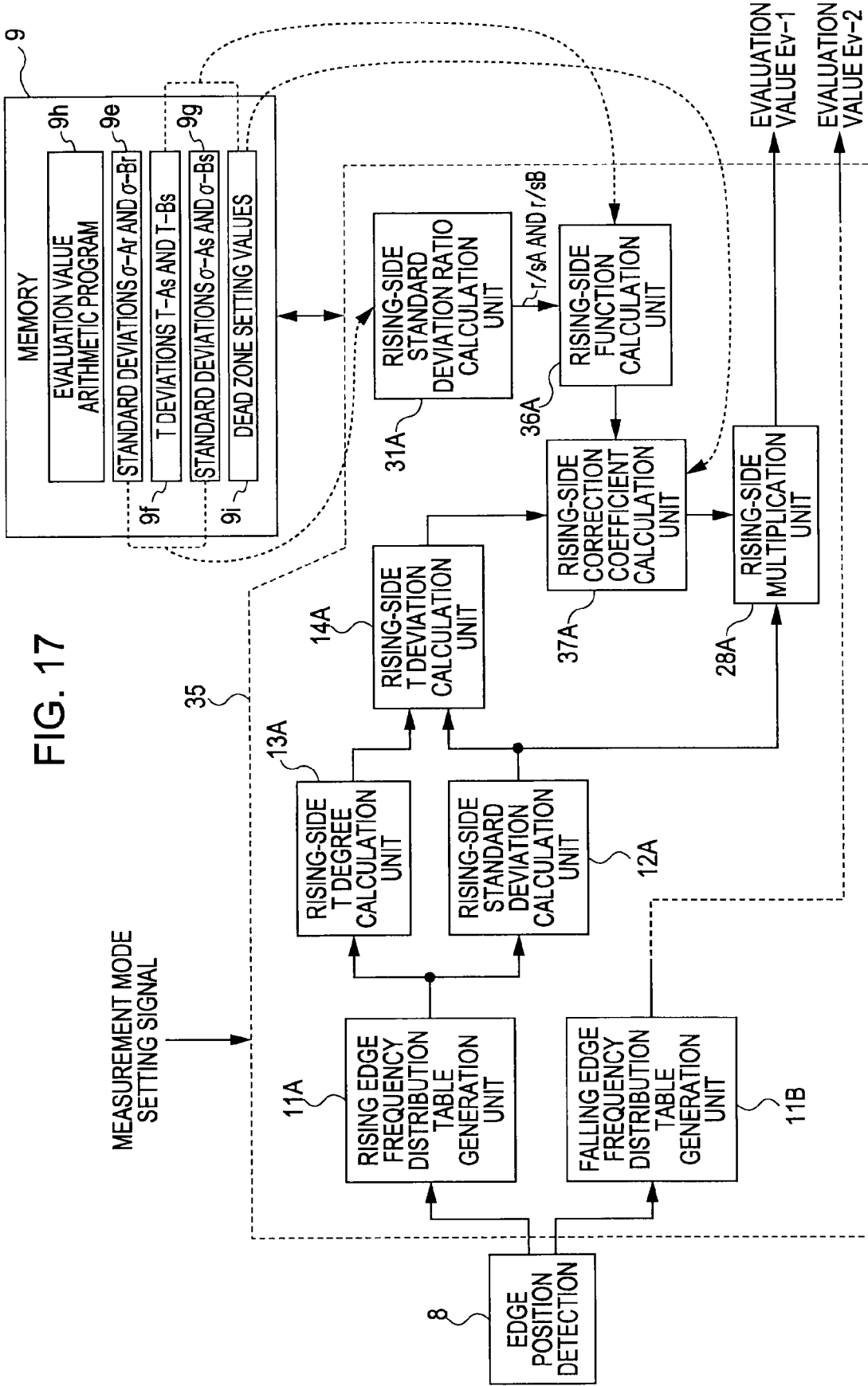
FIG. 17 is a diagram for explaining a configuration for realizing the operation of the third example of the second embodiment.

Configuration for performing correction operation provided with dead zone: FIG. 17 is a diagram for explaining a configuration for realizing the correction operation of the third example described above. Similarly to the foregoing FIG. 2, the drawing illustrates in blocks respective functional operations realized by digital signal processing by an evaluation value arithmetic unit 35 (DSP) included in the evaluation apparatus 1 of the third example of the second embodiment.

In the present case, the memory 9 stores an evaluation value arithmetic program 9h for realizing the correction operation of the present example. Through the digital signal processing based on the evaluation value arithmetic program 9h, the evaluation value arithmetic unit 35 realizes the respective functional operations of the third example.

As understood from the foregoing description, also in the third example, the values of the standard deviations σ-as and σ-Bs and the T deviations T-As and T-Bs have previously been calculated for the correction discs A and B and stored in the memory 9 in the preparation mode (the reference numerals 9g and 9f in the drawing). The respective functional operations to be performed by the evaluation value arithmetic unit 35 in response to the above-described preparation mode are similar to the operations described in the foregoing FIG. 13. Thus, another description of the operations will be omitted.

It is needless to say that, also in the present case, the memory 9 stores the standard deviation values σ-Ar and σ-Br (9e) previously calculated by the reference machine.

Further, also in the present case, the falling-side evaluation value Ev-2 is in fact calculated. Therefore, the present example is configured such that the values of the standard deviations σ-As and σ-Bs, the T deviations T-As and T-Bs, and the standard deviations σ-Ar and σ-Br calculated for the falling edge positions have been stored in the memory 9 in the measurement mode.

Further, in the present case, the information for setting the dead zone (e.g., two T deviation values) has previously been stored in the memory 9 as dead zone setting values 9i shown in the drawing.

As illustrated in FIG. 17, the functional operations of the third example performed by the evaluation value arithmetic unit 35 in response to the measurement mode are substantially similar to the operations described in the foregoing FIG. 14. In the present case, however, the functional operations of the rising-side function calculation unit 32A and the rising-side correction coefficient calculation unit 33A illustrated in the foregoing FIG. 14 are replaced by the functional operations of a rising-side function calculation unit 36A and a rising-side correction coefficient calculation unit 37A described below.

Also in the present case, description with illustration will be made only of the functional operations on the rising side. As for the falling side, it suffices if functional operations similar to the functional operations on the rising side are performed. Thus, illustration and description of the functional operations on the falling side will be omitted.

On the basis of the values of the standard deviation ratios σ-Ar/σ-As and σ-Br/c-Bs calculated by the rising-side standard deviation ratio calculation unit 31A, the T deviation values T-As and T-Bs stored in the memory 9 (i.e., the values corresponding to the coordinates (x1, y1) and (x4, y4) previously described), and the two T deviation values as the dead zone setting values 9i (corresponding to x2 and x3), the rising-side function calculation unit 36A calculates the values of the two quadratic functions (a, b, c, and d) and y2=y3=yr in accordance with the previously described procedure.

Then, on the basis of the values of the two quadratic functions and yr calculated by the rising-side function calculation unit 36A and the dead zone setting values 9i stored in the memory 9, the rising-side correction coefficient calculation unit 37A calculates the correction coefficient value according to the T deviation value calculated by the rising-side T deviation calculation unit 14A.

That is, when x and y represent the T deviation value calculated by the rising-side T deviation calculation unit 14A and the correction coefficient value, respectively, and when x2 and x3 of the dead zone setting values 9i represent a positive polarity value and a negative polarity value, respectively, the rising-side correction coefficient calculation unit 37A calculates the correction coefficient as follows, i.e., $y=ax+b$ when $x>x2$, $y=yr$ when $x3 \leqq x \leqq x2$, and $y=cx+d$ when $x<x3$.

The rising-side multiplication unit 28A multiplies the standard deviation value σ calculated by the rising-side standard deviation calculation unit 12A by the correction coefficient calculated as described above. Then, the rising-side multiplication unit 28A outputs the result of the multiplication as the evaluation value Ev-1.

Figure 18:
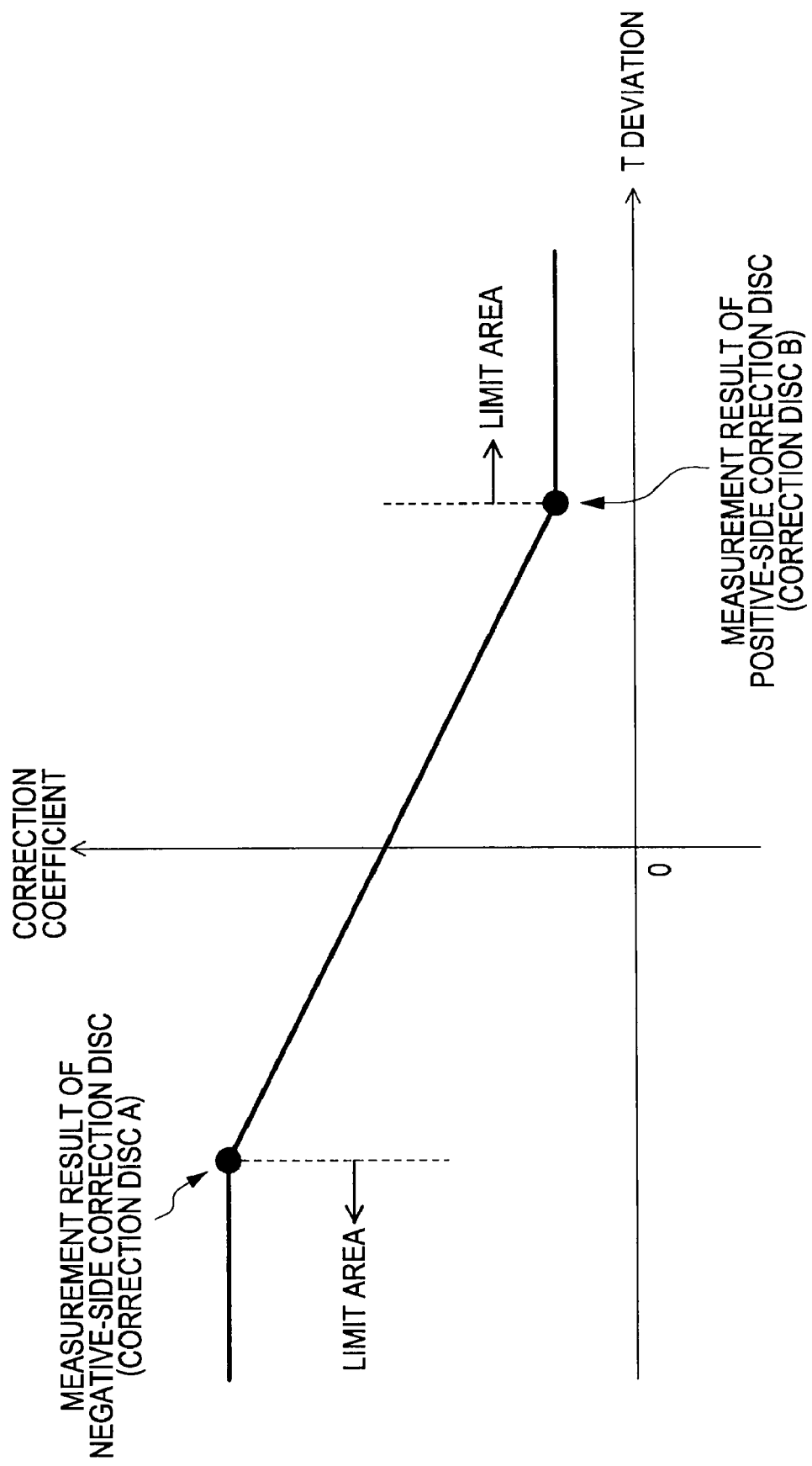
FIG. 18 is a diagram for explaining a modified example of the second and third examples of the second embodiment.
Figure 19A:
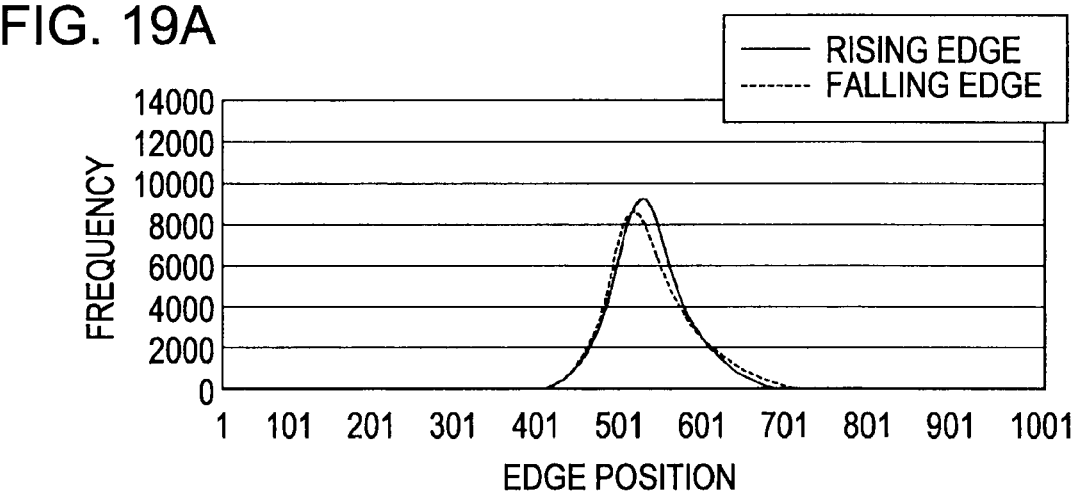
FIGS. 19A to 19C are diagrams for explaining forms of the frequency distribution of the edge positions of a read signal, illustrating measurement results of the standard deviation of respective discs measured by the same measuring machine.
Figure 19B:
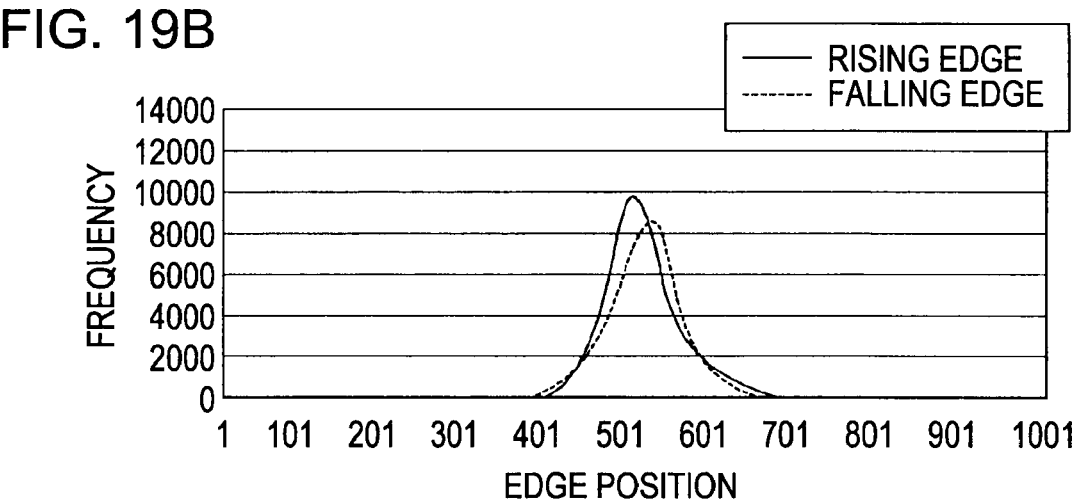
Figure 19C:
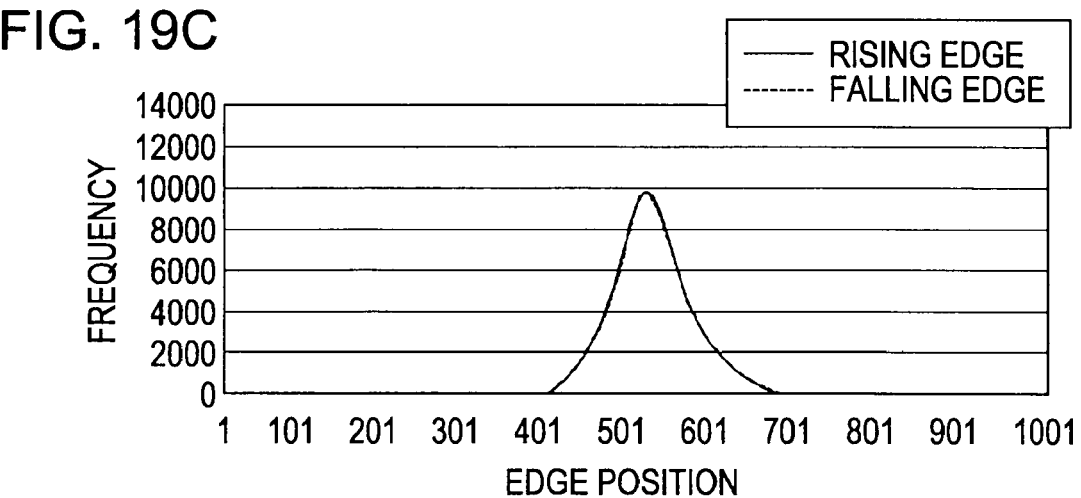
Figure 20A:
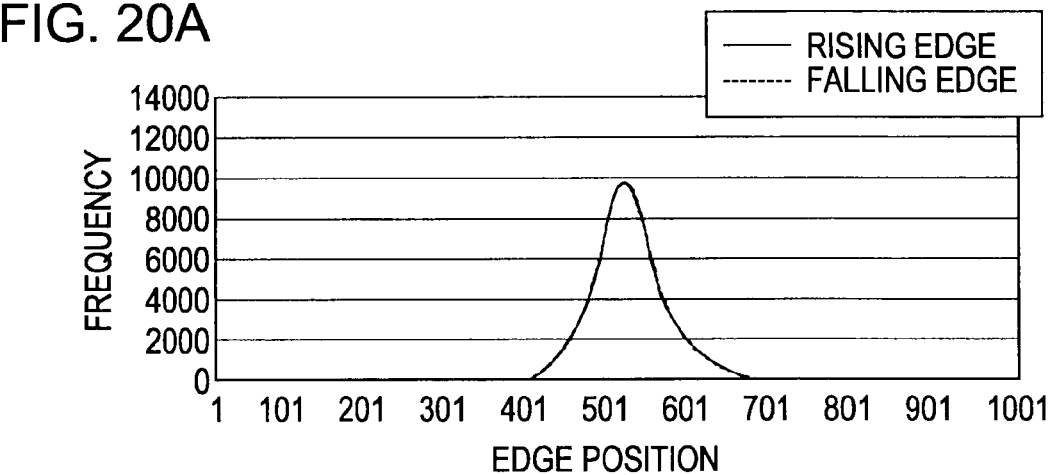
FIGS. 20A to 20C are diagrams for explaining forms of the frequency distribution of the edge positions of a read signal, illustrating measurement results of the standard deviation of the same disc measured by respective measuring machines.
Figure 20B:
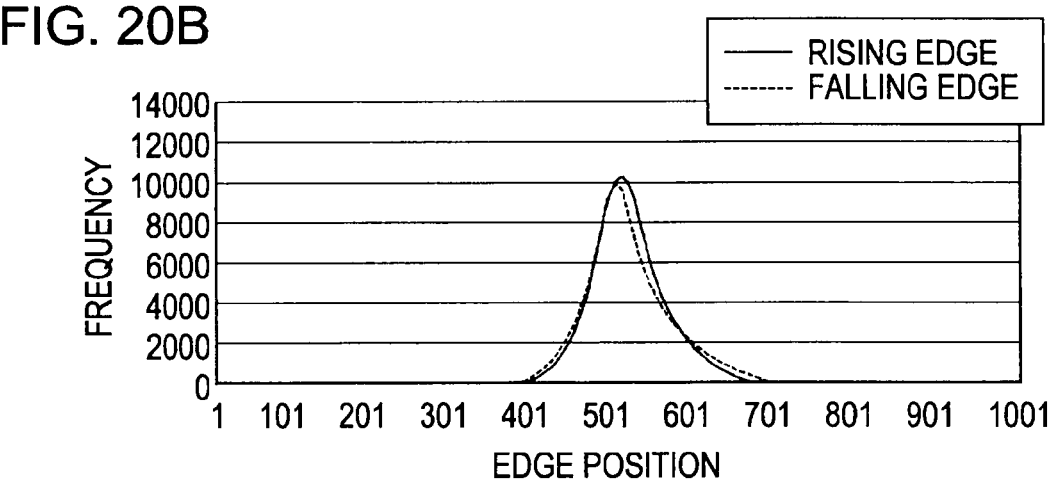
Figure 20C:
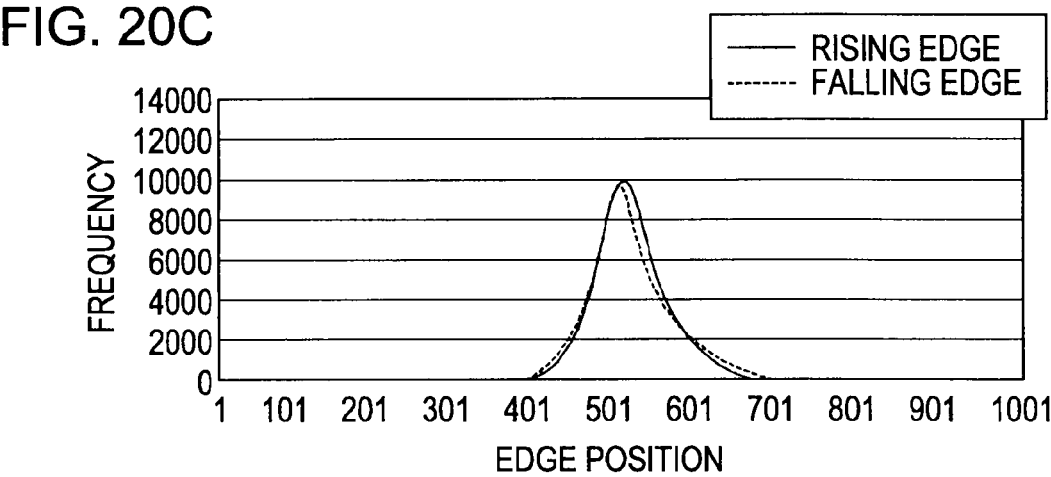

Modified example of second and third examples: Subsequently, with reference to the following FIG. 18, a modified example of the second and third examples of the second embodiment will be described. FIG. 18 illustrates, for example, a case in which the modified example is applied to the second example.

The modified example described herein limits the correction coefficient value in an area in which the value (the absolute value) of the T deviation exceeds a predetermined threshold value. Specifically, in the present case, in the calculation of the correction coefficient using the T deviation value, if the calculated T deviation value is smaller than the T deviation value T-As calculated for the correction disc A or larger than the T deviation value T-Bs calculated for the correction disc B, a predetermined constant value is selected as the correction coefficient.

Herein, as previously described, the embodiment is based on the assumption that the optical discs D each having a relatively large T deviation value have previously been selected as the correction discs A and B. For example, the actual selection is performed such that the selected optical discs D have a skew amount close to the maximum skew amount expected to be observed in the optical discs D as the evaluation targets.

With the above taken into account, it can be understood that, if the correction coefficient based on the linear function is calculated also in the area in which the calculated T deviation value exceeds the T deviation T-As or T-Bs, the correction coefficient value calculated in the area becomes a substantially large value. Such an increase in the correction coefficient means that a value far away from the actually calculated value is calculated as the evaluation value Ev. Therefore, an abnormal value may be calculated as the evaluation value Ev in such a case.

In view of the above, if the absolute value of the T deviation exceeds a predetermined value, a correction coefficient set to a predetermined constant value is selected to prevent the above-described excessive correction. Accordingly, it is possible to prevent an excessively abnormal value form being calculated as the evaluation value Ev.

For the sake of confirmation, to realize the operations of the above-described modified example, the correction coefficient calculation units 33 of the second example and the correction coefficient calculation units 37 of the third example are configured to select, for the rising side and the falling side, the correction coefficient previously set to the predetermined value, if the T deviation value calculated by the T deviation calculation units 14 is smaller than the T deviation T-As or larger than the T deviation T-Bs.

Modified Examples

The embodiments of the present invention have been described above. The prevent invention, however, is not limited to the specific examples described above. For example, the above description has been made of an example in which the operation of each of the evaluation value arithmetic units (10, 20, 25, 30, and 35) of the respective examples is realized by the digital signal processing by the DSP. However, another configuration is possible in which the operation of each of the evaluation value arithmetic units is realized by an analog circuit.

Further, the above description has been made of an example in which the value of (xi−A) is raised to the third power in the T degree τ. However, it suffices if the value of (xi−A) is raised to the power of an odd number such that at least a sign is assigned to the calculation result. That is, it suffices if the value of (xi−A) is raised to the power of 2m+1 (m represents a natural number excluding zero).

Further, in the second embodiment, the correction of the standard deviation value using the correction coefficient is performed only once. However, it is also possible to obtain a function representing the correlation between the standard deviation value of the reference machine and the standard deviation value of the present evaluation apparatus 1 by using the corrected value in accordance with a least squares method, for example, recalculate the correction coefficient on the basis of the function, and then correct the standard deviation value again. With this configuration, the accuracy of the correction can be further improved.

Further, the above description has been made of an example in which both of the rising edges and the falling edges of the read signal are detected. However, it is also possible to perform the detection of the edge positions and the calculation of the evaluation value for only one of the two types of edges.

Further, the first embodiment may be configured not to average the T deviation values calculated for the rising side and the falling side, respectively, but to output the respective T deviation values as the rising-side evaluation value Ev-1 and the falling-side evaluation value Ev-2, respectively.

Further, the third example of the second embodiment, which eliminates the slope in the dead zone, can be configured to provide a necessary slope in the dead zone.

Further, the above description has been made of an example in which the evaluation method according to an embodiment of the present invention is applied to the calculation of the evaluation value in the quality control of the ROM disc. The present invention, however, can be widely and preferably applied to general purposes of evaluating the quality of a signal read from an optical recording medium, on which signal reading is performed by application of light.

It should be understood by those skilled in the art that various modifications, combinations, sub-combinations and alterations may occur depending on design requirements and other factors insofar as they are within the scope of the appended claims or the equivalents thereof.

What is claimed is:

1. An evaluation apparatus for obtaining an evaluation value of a signal read from an optical recording medium, the evaluation apparatus comprising:

reading means for reading a signal recorded on the optical recording medium;

edge position detection means for detecting edge positions of the read signal acquired by the reading means;

frequency distribution table generation means for generating a frequency distribution table comprising a plurality of classes of the edge positions on the basis of accumulation result of information of the edge positions detected by the edge position detection means; and first calculation means for calculating a T degree value represented as $$[\{\Sigma fi \times (xi-A)^{(2m+1)}\}/F]^{\{1/(2m+1)\}} \quad \text{Formula 1}$$

(wherein m is a natural number excluding zero)

wherein, in the frequency distribution table generated by the frequency distribution table generation means, xi, fi, F, and A represent the value of each of the classes, the frequency of each of the classes, the sum of the frequencies, and the weighted average value, respectively.

2. The evaluation apparatus according to claim 1, further comprising:

standard deviation calculation means for calculating a standard deviation value on the basis of the frequency distribution table generated by the frequency distribution table generation means; and second calculation means for calculating a T deviation value by multiplying the standard deviation value calculated by the standard deviation calculation means by the T degree value calculated by the first calculation means.

3. The evaluation apparatus according to claim 2, wherein the frequency distribution table generation means generates the frequency distribution table separately for rising edge positions and falling edge positions of the read signal detected by the edge position detection means, wherein the first calculation means calculates the T degree based on the frequency distribution table of the rising edge positions generated by the frequency distribution table generation means and the T degree based on the frequency distribution table of the falling edge positions generated by the frequency distribution table generation means, wherein the standard deviation calculation means calculates the standard deviation based on the frequency distribution table of the rising edge positions generated by the frequency distribution table generation means and the standard deviation based on the frequency distribution table of the falling edge positions generated by the frequency distribution table generation means, wherein the second calculation means multiplies the standard deviation value of the rising edge positions calculated by the standard deviation calculation means by the T degree value of the rising edge positions calculated by the first calculation means, and multiplies the standard deviation value of the falling edge positions calculated by the standard deviation calculation means by the T degree value of the falling edge positions calculated by the first calculation means, to thereby calculate the T deviation of the rising edge positions and the T deviation of the falling edge positions, and calculate the average value of the T deviation value of the rising edge positions and the T deviation value of the falling edge positions as an average T deviation, and wherein the evaluation apparatus further comprises:

balance degree calculation means for calculating a balance degree value represented as $$k \times \sqrt{\{\Sigma(f1i-f2i)^2\}/(F1+F2)} \quad \text{Formula 2}$$

wherein f1i and F1 represent the frequency of each of the classes and the sum of the frequencies, respectively, in the frequency distribution table of the rising edge positions generated by the frequency distribution table generation means, f2i and F2 represent the frequency of each of the classes and the sum of the frequencies, respectively, in the frequency distribution table of the falling edge positions generated by the frequency distribution table generation means, and k represents an arbitrary coefficient; and third calculation means for calculating a balanced T deviation value by multiplying the average T deviation value calculated by the second calculation means by the balance degree value calculated by the balance degree calculation means.

4. The evaluation apparatus according to claim 1, further comprising:

standard deviation calculation means for calculating a standard deviation value on the basis of the frequency distribution table generated by the frequency distribution table generation means; and corrected evaluation value calculation means for calculating the value of the evaluation value by calculating a correction coefficient for correcting the standard deviation value on the basis of the T degree value calculated by the first calculation means, and by providing the correction coefficient to the standard deviation value.

5. The evaluation apparatus according to claim 4, wherein the corrected evaluation value calculation means multiplies the standard deviation value by the correction coefficient selected in accordance with the polarity of the T degree value.

6. The evaluation apparatus according to claim 4, wherein the corrected evaluation value calculation means calculates two T deviation values by multiplying two respective standard deviation values calculated for two previously selected predetermined correction optical recording media by the standard deviation calculation means by two respective T degree values calculated for the two correction optical recording media by the first calculation means, respectively, and wherein the corrected evaluation value calculation means obtains the correction coefficient by calculation on the basis of information of a function representing the correlation between the T deviation and the correction coefficient, which is obtained on the basis of the two T deviation values and two respective standard deviation values calculated for the two correction optical recording media by another evaluation apparatus previously selected as a reference machine.

7. The evaluation apparatus according to claim 6, wherein the corrected evaluation value calculation means obtains the function by performing calculation using the value of the ratio between the respective standard deviation values calculated by the reference machine and the evaluation apparatus for one of the correction optical recording media, the value of the ratio between the respective standard deviation values calculated by the reference machine and the evaluation apparatus for the other one of the correction optical recording media, and the two T deviation values calculated for the respective correction optical recording media by the evaluation apparatus.

8. The evaluation apparatus according to claim 6, wherein, when the x-axis represents the T deviation value calculated by the evaluation apparatus and the y-axis represents the value of the ratio between the respective standard deviation values calculated by the reference machine and the evaluation apparatus, the function is obtained as a linear function representing a straight line passing through coordinates points, one of which is defined by the value of the ratio between the respective standard deviation values calculated by the reference machine and the evaluation apparatus for one of the correction optical recording media and the T deviation value calculated by the evaluation apparatus for the one of the correction optical recording media, and the other one of which is defined by the value of the ratio between the respective standard deviation values calculated by the reference machine and the evaluation apparatus for the other one of the correction optical recording media and the T deviation value calculated by the evaluation apparatus for the other one of the correction optical recording media.

9. The evaluation apparatus according to claim 6, wherein the slope of the function is changed in a phased manner.

10. The evaluation apparatus according to claim 6, wherein the slope of the function is zero in an area in which the absolute value of the T deviation is a predetermined value or less, and the slope of the function is constant at a predetermined value in the other areas.

11. The evaluation apparatus according to claim 10, wherein, when the x-axis represents the T deviation value calculated by the evaluation apparatus and the y-axis represents the value of the ratio between the respective standard deviation values calculated by the reference machine and the evaluation apparatus, the value of the y-axis in the area in which the slope is zero and the value of the slope in the other areas than the area in which the slope is zero are obtained by calculation, and wherein, under a condition that x-axis values set to define the area in which the slope is zero have respective corresponding y-axis values which are equal to each other, and that the other areas than the area in which the slope is zero have respective linear functions having the equal slope, the calculation is performed on the basis of the ratio between the respective standard deviation values calculated by the reference machine and the evaluation apparatus for one of the correction optical recording media, the ratio between the respective standard deviation values calculated by the reference machine and the evaluation apparatus for the other one of the correction optical recording media, the two T deviation values calculated by the evaluation apparatus for the respective correction optical recording media, and the two T deviation values set to define the area in which the slope is zero.

12. The evaluation apparatus according to claim 6, wherein the slope of the function is zero in an area in which the absolute value of the T deviation exceeds a predetermined value.

13. An evaluation method for obtaining an evaluation value of a signal read from an optical recording medium, the evaluation method comprising the steps of:

generating a frequency distribution table comprising a plurality of classes of edge positions on the basis of accumulation result of information of the edge positions detected from the read signal acquired by the reading of a signal recorded on the optical recording medium; and calculating a T degree value represented as $$[\{\Sigma fi \times (xi-A)^{(2m+1)}\}/F]^{\{1/(2m+1)\}} \qquad \text{Formula 1}$$

(wherein m is a natural number excluding zero)

wherein, in the frequency distribution table generated by the frequency distribution table generation step, xi, fi, F, and A represent the value of each of the classes, the frequency of each of the classes, the sum of the frequencies, and the weighted average value, respectively.

14. A computer readable non-transitory recording medium on which is recorded a program to be executed by a signal processing apparatus to obtain an evaluation value of a signal read from an optical recording medium, the program causing the signal processing apparatus to perform:

a frequency distribution table generation process of generating a frequency distribution table comprising a plurality of classes of edge positions on the basis of accumulation result of information of the edge positions detected from the read signal acquired by the reading of a signal recorded on the optical recording medium; and a first calculation process of calculating a T degree value represented as $$[\{\Sigma fi \times (xi-A)^{(2m+1)}\}/F]^{\{1/(2m+1)\}} \qquad \text{Formula 1}$$

(wherein m is a natural number excluding zero)

wherein, in the frequency distribution table generated by the frequency distribution table generation process, xi, fi, F, and A represent the value of each of the classes, the frequency of each of the classes, the sum of the frequencies, and the weighted average value, respectively.

15. An evaluation apparatus for obtaining an evaluation value of a signal read from an optical recording medium, the evaluation apparatus comprising:

a reading device configured to read a signal recorded on the optical recording medium;

an edge position detection device configured to detect edge positions of the read signal acquired by the reading device;

a frequency distribution table generation device configured to generate a frequency distribution table comprising a plurality of classes of the edge positions on the basis of accumulation result of information of the edge positions detected by the edge position detection device; and a first calculation device configured to calculate a T degree value represented as $$[\{\Sigma fi \times (xi-A)^{(2m+1)}\}/F]^{\{1/(2m+1)\}} \qquad \text{Formula 1}$$

(wherein m is a natural number excluding zero)

wherein, in the frequency distribution table generated by the frequency distribution table generation device, xi, fi, F, and A represent the value of each of the classes, the frequency of each of the classes, the sum of the frequencies, and the weighted average value, respectively.

* * * * *